(12) United States Patent
Narroschke et al.

(10) Patent No.: US 9,906,798 B2
(45) Date of Patent: Feb. 27, 2018

(54) IMAGE ENCODING METHOD, IMAGE DECODING METHOD, IMAGE ENCODING APPARATUS, AND IMAGE DECODING APPARATUS

(71) Applicant: Panasonic Intellectual Property Corporation of America, Torrance, CA (US)

(72) Inventors: Matthias Narroschke, Schaafheim (DE); Hisao Sasai, Osaka (JP)

(73) Assignee: SUN PATENT TRUST, New York, NY (US)

( * ) Notice: Subject to any disclaimer, the term of this patent is extended or adjusted under 35 U.S.C. 154(b) by 953 days.

(21) Appl. No.: 14/283,345

(22) Filed: May 21, 2014

(65) Prior Publication Data

US 2014/0355684 A1 Dec. 4, 2014

Related U.S. Application Data

(60) Provisional application No. 61/829,290, filed on May 31, 2013.

(51) Int. Cl.
*H04N 7/12* (2006.01)
*H04N 19/176* (2014.01)
(Continued)

(52) U.S. Cl.
CPC ......... *H04N 19/176* (2014.11); *H04N 19/117* (2014.11); *H04N 19/139* (2014.11);
(Continued)

(58) Field of Classification Search
CPC .... H04N 19/176; H04N 19/82; H04N 19/117; H04N 19/86; H04N 19/80
(Continued)

(56) References Cited

U.S. PATENT DOCUMENTS

2010/0220939 A1* 9/2010 Tourapis ............... G06T 7/13
382/261
2012/0219216 A1* 8/2012 Sato .................... G06T 9/00
382/166

(Continued)

OTHER PUBLICATIONS

Joint Collaborative Team on Video Coding (JCT-VC) of ITU-T SG16 WP3 and ISO/IEC JTC1/SC29/WG11, 12th Meeting: Geneva, CH, Jan. 14-23, 2013, JCTVC-L1003_v34, "High Efficiency Video Coding (HEVC) text specification draft 10 (for FDIS & Last Call)".

*Primary Examiner* — Gims Philippe
(74) *Attorney, Agent, or Firm* — Wenderoth, Lind & Ponack, L.L.P.

(57) ABSTRACT

An image encoding method includes: selecting one motion prediction model from a plurality of motion prediction models including a translational motion model and a non-translational motion model for each of blocks in the image; performing motion prediction using the selected motion prediction model to generate a prediction image; generating a reconstructed image using the prediction image; determining that filtering is to be performed if the non-translational motion model is selected for at least one of a first block and a second block that is adjacent to the first block; and performing the filtering on a boundary between the reconstructed image for the first block and the reconstructed image for the second block if it is determined that the filtering is to be performed.

14 Claims, 35 Drawing Sheets

(51) Int. Cl.
*H04N 19/139* (2014.01)
*H04N 19/159* (2014.01)
*H04N 19/117* (2014.01)
*H04N 19/14* (2014.01)
*H04N 19/82* (2014.01)
*H04N 19/86* (2014.01)

(52) U.S. Cl.
CPC ........... *H04N 19/14* (2014.11); *H04N 19/159* (2014.11); *H04N 19/82* (2014.11); *H04N 19/86* (2014.11)

(58) Field of Classification Search
USPC ... 375/240.16, E7.243, E7.19, 240.02, 240.2
See application file for complete search history.

(56) References Cited

U.S. PATENT DOCUMENTS

| | | | |
|---|---|---|---|
| 2013/0022124 A1* | 1/2013 | Sekiguchi | H04N 19/105 375/240.16 |
| 2013/0028531 A1* | 1/2013 | Sato | H04N 19/60 382/233 |
| 2014/0218473 A1* | 8/2014 | Hannuksela | H04N 19/597 348/43 |
| 2014/0301463 A1* | 10/2014 | Rusanovskyy | H04N 19/52 375/240.14 |

* cited by examiner

FIG. 10

| Block P | Condition for block Q (block width W) (block P on left side of block Q) | Condition for block Q (block width H) (block P on lower side of block Q) |
|---|---|---|
| Rotation angle $\theta$, MV($d_x$, $d_y$) | Rotation angle $\theta$, MV($d_x - W(1-\cos\theta)$, $d_y + W \cdot \sin\theta$) | Rotation angle $\theta$, MV($d_x$, $d_y$) |
| Enlargement/reduction ($S_x$, $S_y$), MV($d_x$, $d_y$) | Enlargement/reduction ($S_x$, $S_y$), MV($d_x + W(S_x - 1)$, $d_y$) | Enlargement/reduction ($S_x$, $S_y$), MV($d_x$, $d_y + H(S_x - 1)$) |
| X-axis direction skewing $\theta$, MV($d_x$, $d_y$) | X-axis direction skewing $\theta$, MV($d_x$, $d_y$) | X-axis direction skewing $\theta'$, MV($d_x + H \cdot \tan\theta'$, $d_y$) |
| Y-axis direction skewing $\theta$, MV($d_x$, $d_y$) | Y-axis direction skewing $\theta'$, MV($d_x$, $d_y + W \cdot \tan\theta'$) | Y-axis direction skewing $\theta$, MV($d_x$, $d_y$) |

FIG. 23

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 26
Stream of TS packets
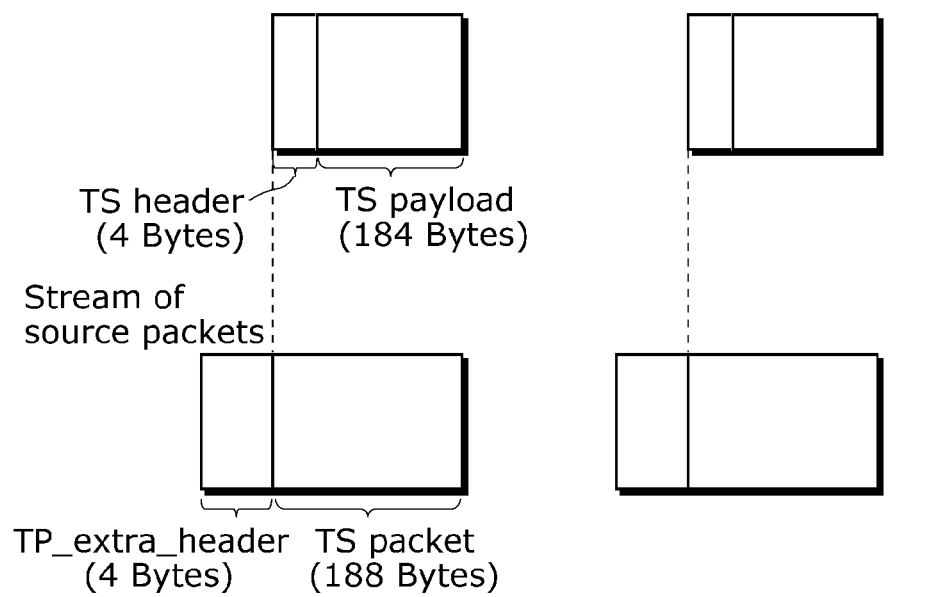
TS header (4 Bytes)   TS payload (184 Bytes)
Stream of source packets
TP_extra_header (4 Bytes)   TS packet (188 Bytes)
Multiplexed data
SPN 0 1 2 3 4 5 6 7 ...
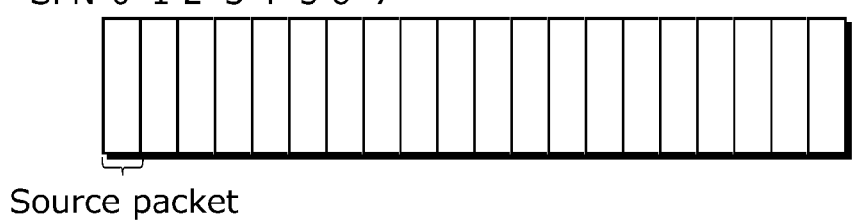
Source packet

FIG. 34

| Corresponding standard | Driving frequency |
|---|---|
| MPEG-4 AVC | 500 MHz |
| MPEG-2 | 350 MHz |
| ⋮ | ⋮ |

IMAGE ENCODING METHOD, IMAGE DECODING METHOD, IMAGE ENCODING APPARATUS, AND IMAGE DECODING APPARATUS

CROSS REFERENCE TO RELATED APPLICATION

The present application claims the benefit of U.S. Provisional Patent Application No. 61/829,290 filed on May 31, 2013. The entire disclosure of the above-identified application, including the specification, drawings and claims is incorporated herein by reference in its entirety.

FIELD

The present disclosure relates to an image encoding method, an image decoding method, an image encoding apparatus, and an image decoding apparatus.

BACKGROUND

The HEVC (High Efficiency Video Coding) standard that has been studied as a next-generation image encoding standard is specified as the latest and most advanced video encoding standard system of the ITU-T (International Telecommunication Union Telecommunication Standardization Sector) standard conventionally typified by H.26× and the ISO/IEC standard typified by MPEG-x (for example, see Non-Patent Literature 1).

In the HEVC standard, in order to reduce coding degradation (a difference between an original signal before encoding and encoded and decoded signals), motion prediction processing and motion compensation processing are performed on a block-by-block basis, followed by deblocking processing of subjecting a boundary between blocks to filtering.

CITATION LIST

Non Patent Literature

[Non-Patent Literature 1] Joint Collaborative Team on Video Coding (JCT-VC) of ITU-T SG16 WP3 and ISO/IEC JTC1/SC29/WG11, 12th Meeting: Geneva, CH, 14-23 Jan. 2013, JCTVC-L1003_v34, "High Efficiency Video Coding (HEVC) text specification draft 10 (for FDIS & Last Call)"

SUMMARY

In these image encoding method and image decoding method, image quality improvement has been desired.

One non-limiting and exemplary embodiment provides an image encoding method or an image decoding method capable of improving the image quality.

An image encoding method according to one aspect of the present disclosure features an image encoding method for encoding an image, the image encoding method including: selecting one motion prediction model from a plurality of motion prediction models for each of blocks in the image, the plurality of motion prediction models including a translational motion model and a non-translational motion model different from the translational motion model; performing motion prediction using the selected motion prediction model to generate a prediction image for each of the blocks; generating a reconstructed image for each of the blocks using the prediction image; determining that filtering is to be performed if the non-translational motion model is selected for at least one of a first block and a second block, the first block being one of the blocks, and the second block being another one of the blocks and adjacent to the first block; and performing the filtering on a boundary between the reconstructed image for the first block and the reconstructed image for the second block if it is determined in the determining that the filtering is to be performed, the filtering being for reducing an image distortion at the boundary.

An image decoding method according to one aspect of the present disclosure features an image decoding method for decoding an encoded image obtained by encoding an image, the image decoding method including: selecting one motion prediction model from a plurality of motion prediction models for each of blocks in the image, the plurality of motion prediction models including a translational motion model and a non-translational motion model different from the translational motion model; performing motion prediction using the selected motion prediction model to generate a prediction image for each of the blocks; generating a reconstructed image for each of the blocks using the prediction image; determining that filtering is to be performed if the non-translational motion model is selected for at least one of a first block and a second block, the first block being one of the blocks, and the second block being another one of the blocks and adjacent to the first block; and performing the filtering on a boundary between the reconstructed image for the first block and the reconstructed image for the second block if it is determined in the determining that the filtering is to be performed, the filtering being for reducing an image distortion at the boundary.

These general or specific aspects may be implemented using a system, a method, an integrated circuit, a computer program or a computer-readable recording medium such as a CD-ROM, or any combination of systems, methods, integrated circuits, computer programs or recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

The present disclosure provides an image encoding method or an image decoding method capable of improving the image quality.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 10 is a diagram for describing the process of determining the adjacent reference in Embodiment 1.

FIG. 23 illustrates a structure of multiplexed data.

FIG. 26 shows a structure of TS packets and source packets in the multiplexed data.

FIG. 34 shows an example of a look-up table in which video data standards are associated with driving frequencies.

DESCRIPTION OF EMBODIMENTS

Underlying Knowledge Forming Basis of the Present Disclosure

In deblocking processing, the following pieces of information for two blocks across a block boundary are used: (1) information indicating whether intra prediction (intra picture prediction) or inter prediction (inter picture prediction) has been employed; (2) information indicating whether there is any non-zero transform coefficient; (3) information about a motion vector and a reference image (a reference frame); (4) a quantization parameter; and (5) an adjacent pixel value.

Figure 1:
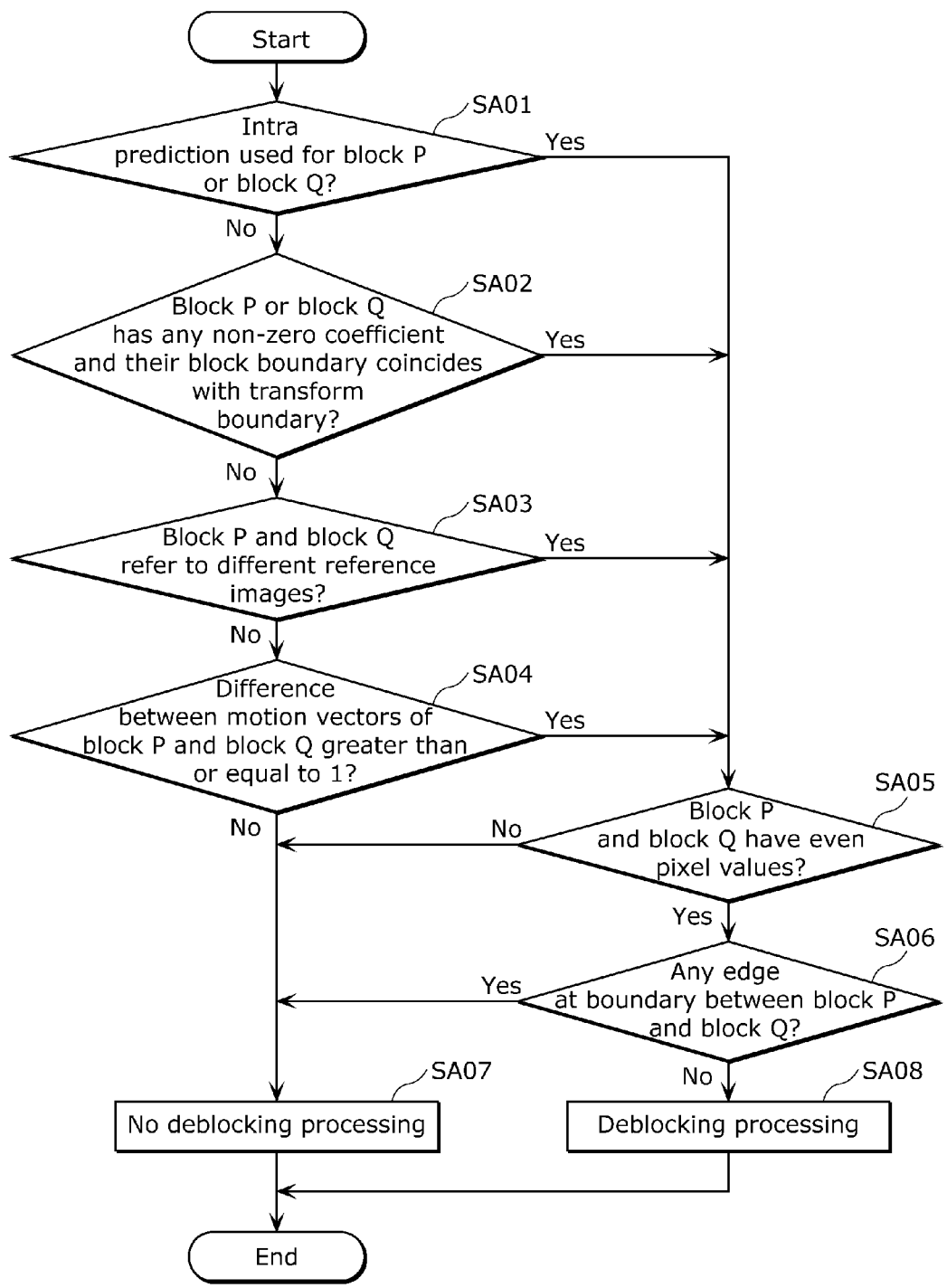
FIG. 1 is a flowchart showing a flow of an execution determining process of deblocking processing.

Using these pieces of information, it is determined whether to execute the deblocking processing. FIG. 1 is a flowchart showing an execution determining process of deblocking processing employed in HEVC.

Here, two blocks across a block boundary are referred to as block P and block Q. First, it is determined whether at least one of the block P and the block Q is a block that has been subjected to the intra prediction (SA01). Also, it is determined whether at least one of the block P and the block Q contains any non-zero transform coefficient and their block boundary coincides with a boundary between blocks to be used for transform processing (SA02). Further, it is determined whether the motion vectors of the block P and the block Q refer to different reference images (SA03). Additionally, it is determined whether an absolute value of the difference between the motion vectors of the block P and the block Q is greater than or equal to 1 (SA04).

If all of these determination conditions SA01 to SA04 are not met, it is determined that no deblocking processing is to be performed (SA07). On the other hand, if any of the determination conditions SA01 to SA04 is met, it is further determined whether the block P and the block Q have even pixel values (variations in pixel value are small) (SA05), and it is then determined whether there is any edge between the blocks (SA06).

If the pixel values are even (Yes in SA05) and there is no edge (No in SA06), it is determined that the deblocking processing is to be performed (SA08). On the other hand, if the pixel values are uneven (No in SA05) or there is an edge (Yes in SA06), it is determined that no deblocking processing is to be performed (SA07).

However, in the method illustrated in FIG. 1, with respect to the inter prediction, whether to perform the deblocking processing is determined using only the size and reference relationship of the motion vectors. In other words, this method fails to consider the case in which different motion prediction models are used in adjacent blocks. Accordingly, in the case where different prediction models are used in adjacent blocks, the problem arises in that image distortion at the block boundary (boundary distortion) cannot be reduced in an appropriate manner.

Thus, the present embodiment will describe an image encoding method, an image encoding apparatus, an image decoding method and an image decoding apparatus capable of improving image quality by reducing the boundary distortion appropriately when a plurality of motion prediction models are employed using the inter prediction.

An image encoding method according to one aspect of the present disclosure features an image encoding method for encoding an image, the image encoding method including: selecting one motion prediction model from a plurality of motion prediction models for each of blocks in the image, the plurality of motion prediction models including a translational motion model and a non-translational motion model different from the translational motion model; performing motion prediction using the selected motion prediction model to generate a prediction image for each of the blocks; generating a reconstructed image for each of the blocks using the prediction image; determining that filtering is to be performed if the non-translational motion model is selected for at least one of a first block and a second block, the first block being one of the blocks, and the second block being another one of the blocks and adjacent to the first block; and performing the filtering on a boundary between the reconstructed image for the first block and the reconstructed image for the second block if it is determined in the determining that the filtering is to be performed, the filtering being for reducing an image distortion at the boundary.

In this way, the above-described image encoding method determines that the filtering is to be performed if the motion prediction model different from the translational motion model is used. This makes it possible to reduce the boundary distortion appropriately, thus improving the image quality.

For example, in the determining: it may be determined whether or not both of conditions (i) and (ii) are satisfied, (i) a first reference region that is referred to for generating the prediction image for the first block and a second reference region that is referred to for generating the prediction image for the second block being included in a same reference image, and (ii) the first reference region and the second reference region being adjacent to each other with their boundaries coinciding with each other; it may be determined that the filtering is to be performed if the non-translational motion model is selected for at least one of the first block and the second block and if any of the conditions (i) and (ii) is dissatisfied; and it may be determined that the filtering is not to be performed if both of the conditions (i) and (ii) are satisfied.

This makes it possible to appropriately determine whether to execute the filtering, thus improving the image quality.

For example, in the determining, it may be determined that the first reference region and the second reference region are adjacent to each other with their boundaries coinciding with each other, using different computation techniques for when the first block and the second block are vertically adjacent to each other and for when the first block and the second block are horizontally adjacent to each other.

This makes it possible to appropriately determine that the first reference region and the second reference region are adjacent to each other with their boundaries coinciding with each other.

For example, in the determining, it may be determined that the first reference region and the second reference region are not adjacent to each other with their boundaries coinciding with each other if the motion prediction model selected for the first block and the motion prediction model selected for the second block are different.

This makes it possible to appropriately determine that the first reference region and the second reference region are adjacent to each other with their boundaries coinciding with each other.

For example, in the determining, it may be determined whether or not a distance between a side of the first reference region and a side of the second reference region is less than one pixel, and it may be determined that the first reference region and the second reference region are adjacent to each other with their boundaries coinciding with each other if the distance is less than one pixel.

This makes it possible to appropriately determine that the first reference region and the second reference region are adjacent to each other with their boundaries coinciding with each other.

For example, the non-translational motion model may be the motion prediction model including at least one of rotation, enlargement, reduction, skewing, and inversion.

An image decoding method according to one aspect of the present disclosure features an image decoding method for decoding an encoded image obtained by encoding an image, the image decoding method including: selecting one motion prediction model from a plurality of motion prediction models for each of blocks in the image, the plurality of motion prediction models including a translational motion model and a non-translational motion model different from the translational motion model; performing motion prediction using the selected motion prediction model to generate a prediction image for each of the blocks; generating a reconstructed image for each of the blocks using the prediction image; determining that filtering is to be performed if the non-translational motion model is selected for at least one of a first block and a second block, the first block being one of the blocks, and the second block being another one of the blocks and adjacent to the first block; and performing the filtering on a boundary between the reconstructed image for the first block and the reconstructed image for the second block if it is determined in the determining that the filtering is to be performed, the filtering being for reducing an image distortion at the boundary.

In this way, the above-described image decoding method determines that the filtering is to be performed if the motion prediction model different from the translational motion model is used. This makes it possible to reduce the boundary distortion appropriately, thus improving the image quality.

For example, in the determining: it may be determined whether or not both of conditions (i) and (ii) are satisfied, (i) a first reference region that is referred to for generating the prediction image for the first block and a second reference region that is referred to for generating the prediction image for the second block being included in a same reference image, and (ii) the first reference region and the second reference region being adjacent to each other with their boundaries coinciding with each other; it may be determined that the filtering is to be performed if the non-translational motion model is selected for at least one of the first block and the second block and if any of the conditions (i) and (ii) is dissatisfied; and it may be determined that the filtering is not to be performed if both of the conditions (i) and (ii) are satisfied.

This makes it possible to appropriately determine whether to execute the filtering, thus improving the image quality.

For example, in the determining, it may be determined that the first reference region and the second reference region are adjacent to each other with their boundaries coinciding with each other, using different computation techniques for when the first block and the second block are vertically adjacent to each other and for when the first block and the second block are horizontally adjacent to each other.

This makes it possible to appropriately determine that the first reference region and the second reference region are adjacent to each other with their boundaries coinciding with each other.

For example, in the determining, it may be determined that the first reference region and the second reference region are not adjacent to each other with their boundaries coinciding with each other if the motion prediction model selected for the first block and the motion prediction model selected for the second block are different.

This makes it possible to appropriately determine that the first reference region and the second reference region are adjacent to each other with their boundaries coinciding with each other.

For example, in the determining, it may be determined whether or not a distance between a side of the first reference region and a side of the second reference region is less than one pixel, and it may be determined that the first reference region and the second reference region are adjacent to each other with their boundaries coinciding with each other if the distance is less than one pixel.

This makes it possible to appropriately determine that the first reference region and the second reference region are adjacent to each other with their boundaries coinciding with each other.

For example, the non-translational motion model may be the motion prediction model including at least one of rotation, enlargement, reduction, skewing, and inversion.

Also, an image encoding apparatus according to one aspect of the present disclosure features an image encoding apparatus that encodes an image, the image encoding apparatus including: processing circuitry; and storage that is accessible from the processing circuitry. The processing circuitry uses the storage to execute the above-described image encoding method.

In this way, the above-described image encoding apparatus determines that the filtering is to be performed if the motion prediction model different from the translational motion model is used. This makes it possible to reduce the boundary distortion appropriately, thus improving the image quality.

Further, an image decoding apparatus according to one aspect of the present disclosure features an image decoding apparatus that decodes an encoded image obtained by encoding an image, the image decoding apparatus including: processing circuitry; and storage that is accessible from the processing circuitry. The processing circuitry uses the storage to execute the above-described image decoding method.

In this way, the above-described image decoding apparatus determines that the filtering is to be performed if the motion prediction model different from the translational motion model is used. This makes it possible to reduce the boundary distortion appropriately, thus improving the image quality.

These general or specific aspects may be implemented using a system, a method, an integrated circuit, a computer program or a computer-readable recording medium such as a CD-ROM, or any combination of systems, methods, integrated circuits, computer programs or recording media.

The following is a detailed description of embodiments of the present disclosure, with reference to accompanying drawings.

It should be noted that any of the embodiments described below will illustrate a generic or specific example. The numerical values, shapes, materials, structural components, the arrangement and connection of the structural components, steps and the order of the steps mentioned in the following embodiments are merely an example and not intended to limit the scope of claims. Further, among the structural components in the following embodiments, the one that is not recited in any independent claim exhibiting the most generic concept will be described as an arbitrary structural component.

Embodiment 1

A deblocking processing device 100 according to the present embodiment determines that deblocking processing is to be performed if a motion prediction model different from a translational motion model is used. This makes it possible to reduce the boundary distortion appropriately, thus improving the image quality.

Figure 2:
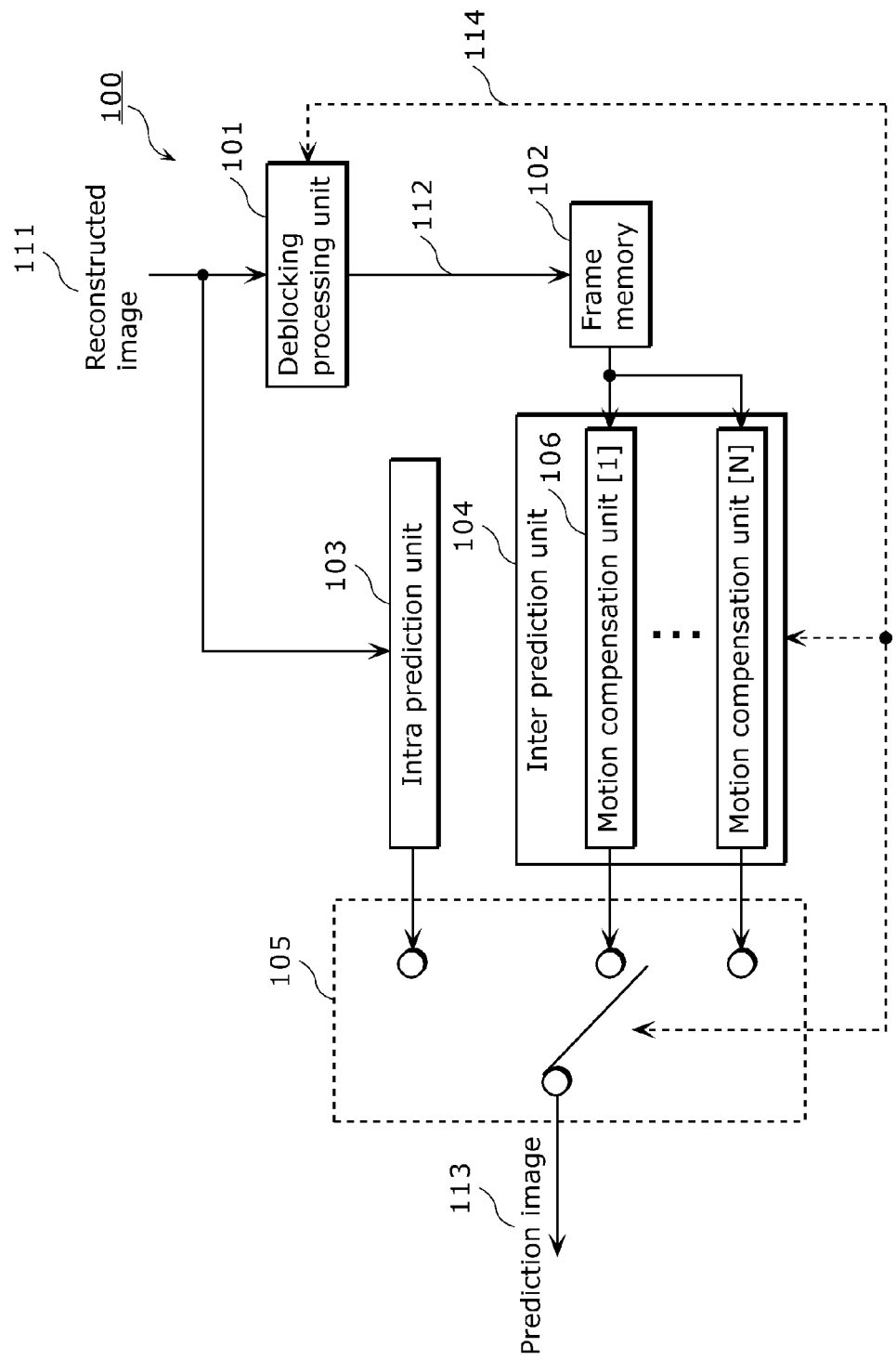
FIG. 2 is a block diagram illustrating a functional configuration of a deblocking processing device according to Embodiment 1.

FIG. 2 is a block diagram illustrating a functional configuration of the deblocking processing device 100 according to the present embodiment.

The deblocking processing device 100 in the present embodiment generates a prediction image 113 using a reconstructed image 111 (a locally decoded image) and prediction information 114. This deblocking processing device 100 includes a deblocking processing unit 101, a frame memory 102, an intra prediction unit 103, an inter prediction unit 104 and a selecting unit 105.

The deblocking processing unit 101 performs deblocking processing (deblocking filtering) on the reconstructed image 111 to generate a decoded image 112. Here, the deblocking processing is filtering for reducing an image distortion at the block boundary.

Further, the deblocking processing unit 101 determines whether to execute the deblocking processing on a block-by-block basis using the prediction information 114. The frame memory 102 stores the decoded image 112. The above-noted block is also referred to as a prediction unit (PU).

Figure 3:
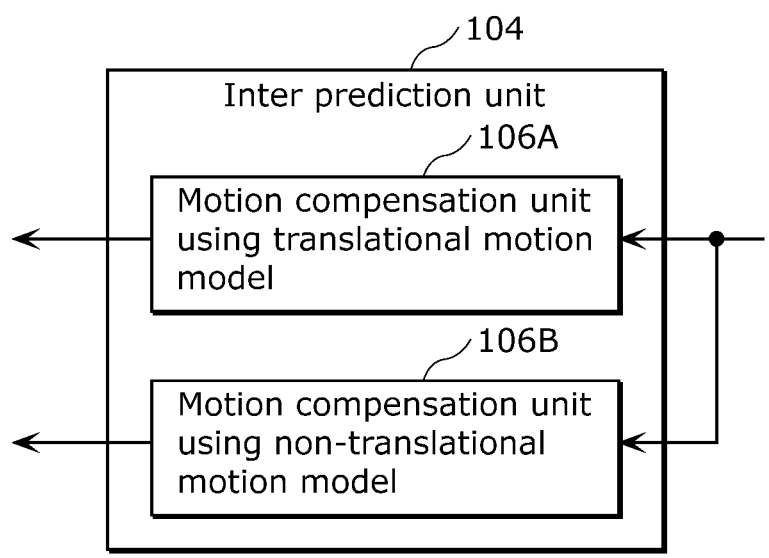
FIG. 3 is a block diagram illustrating a configuration of a variation of an inter prediction unit according to Embodiment 1.

The inter prediction unit 104 performs inter prediction using as a reference image the decoded image 112 stored in the frame memory 102. Further, the inter prediction unit 104 performs the inter prediction using any of N kinds of motion prediction models, where N is an integer greater than or equal to 2. This inter prediction unit 104 includes N motion compensation units 106 in one-to-one correspondence with the motion prediction models. Each of the motion compensation units 106 performs motion compensation using the corresponding motion prediction model to generate the prediction image 113. Here, the N motion prediction models include a translational motion model and a non-translational motion model different from the translational motion model. In other words, the inter prediction unit 104 includes at least a motion compensation unit 106A using the translational motion model and a motion compensation unit 106B using the non-translational motion model, as shown in FIG. 3.

The intra prediction unit 103 performs intra prediction of generating the prediction image 113 from the reconstructed image 111.

The prediction information 114 indicates a prediction method. More specifically, the prediction information 114 indicates one of the intra prediction and the inter prediction, and further indicates the motion prediction model (the translational motion model or the non-translational motion model) used for the inter prediction.

The intra prediction unit 103 and the inter prediction unit 104 generate the prediction image 113 by the prediction method indicated by the prediction information 114.

The selecting unit 105 outputs the prediction image 113 generated by the prediction method indicated by the prediction information 114.

Figure 4:
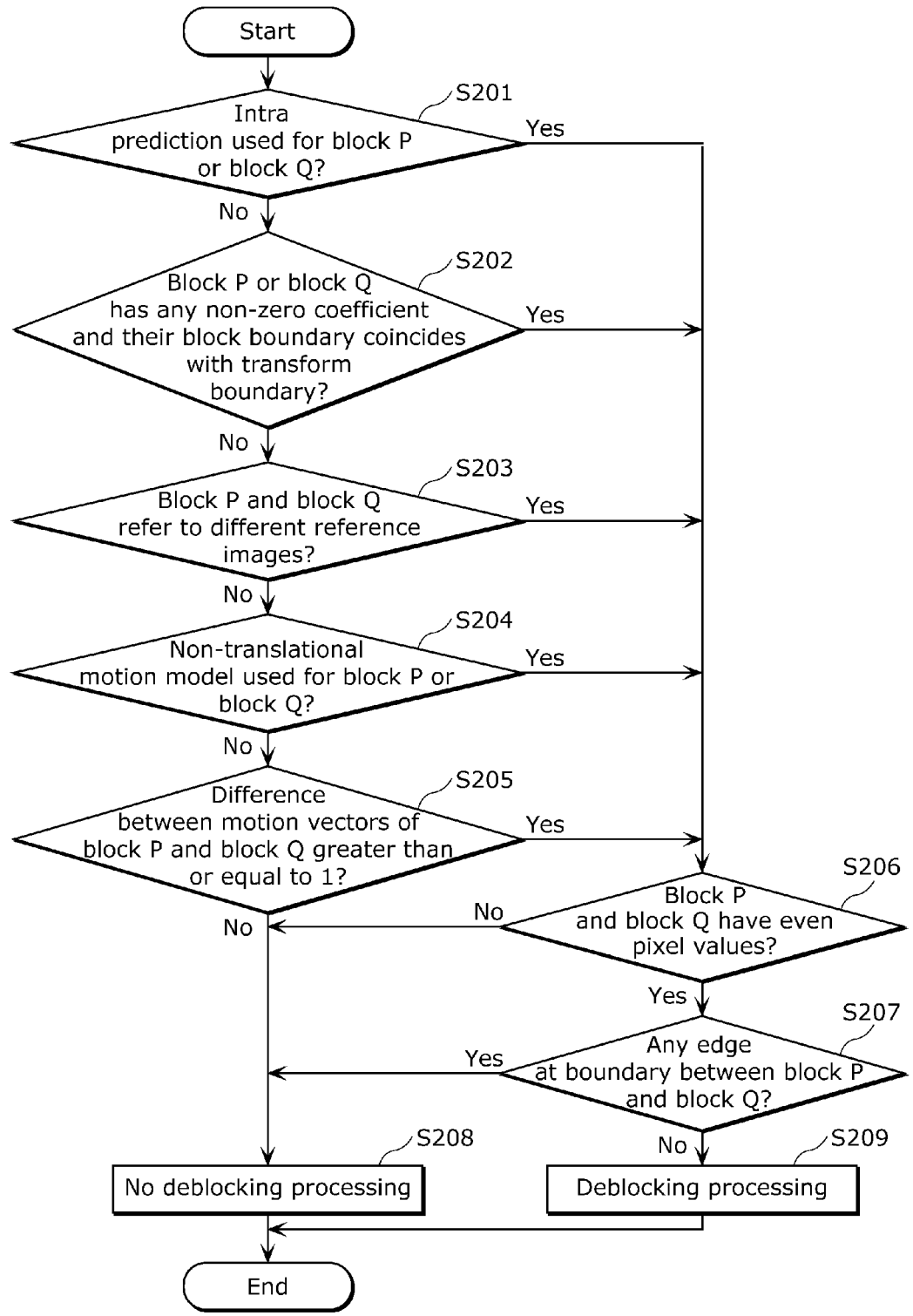
FIG. 4 is a flowchart showing an execution determining process of deblocking processing according to Embodiment 1.

Next, the description will be directed to an operation of the deblocking processing unit 101 according to the present embodiment. FIG. 4 is a flowchart showing an execution determining process of deblocking processing performed by the deblocking processing unit 101. It should be noted that the processing illustrated in FIG. 4 is executed on each block boundary. Also, blocks are obtained by dividing the reconstructed image 111 and each serve as a processing unit (PU) of the motion compensation. In the following, the processing with respect to two adjacent blocks, i.e., block P and block Q will be described.

First, the deblocking processing unit 101 uses the prediction information 114 to determine whether at least one of the block P and the block Q is encoded by the intra prediction (S201).

Also, the deblocking processing unit 101 determines whether at least one of the block P and the block Q contains any non-zero coefficient and a boundary between the block P and the block Q coincides with a boundary between blocks to be used for transform processing (S202). Incidentally, the non-zero coefficient here means, for example, a transform coefficient after transforming and quantizing a prediction error (a prediction residual signal) (a quantization coefficient) that does not have a value of zero. It is noted that this determining need not refer to the transform coefficient after transform and quantization. When the prediction error is zero or sufficiently small, it may be determined that the block does not contain the non-zero coefficient. Further, the block to be used for the transform processing is a processing unit in orthogonal transform and quantization of the prediction error and also referred to as a transform unit (TU).

Moreover, the deblocking processing unit 101 determines whether the reference image to be referred to in the inter prediction (motion prediction) (the decoded image 112 stored in the frame memory 102) is different between the block P and the block Q (S203). Here, the case of the reference image being different is that where the block P and the block Q each refer to one or more images temporally different from each other in a target image, which is an image to be subjected to the motion prediction and the motion compensation.

Also, the deblocking processing unit 101 determines whether a non-translational motion model different from the translational motion model is to be used for the prediction of at least one of the block P and the block Q (S204). In other words, the deblocking processing unit 101 determines whether the translational motion model is able to express the prediction of at least one of the block P and the block Q. Here, the case of the translational motion model being able to express the prediction is that where, when the prediction image of the blocks is generated, a reference block serving as a region to be referred to (a reference region) has the same size as a target block and an image of the reference block is to be used without being rotated or deformed.

Also, the deblocking processing unit 101 determines whether an absolute value of the difference between the motion vectors of the block P and the block Q is greater than or equal to 1 (S205). Incidentally, the motion vector here indicates a relative position between the target block and the reference block when the above-mentioned translational motion model is used. Also, the absolute value of the difference between the two motion vectors being greater than or equal to 1 means that the two reference blocks are spaced apart by at least one pixel in the reference image.

If all of the conditions of Steps S201 to S205 described above are not met, the deblocking processing unit 101 determines that no deblocking processing is to be performed on the block boundary (S208). On the other hand, if at least one of the conditions of Steps S201 to S205 is met, the deblocking processing unit 101 subsequently makes a determination of Step S206.

Incidentally, the determination of Steps S201 to S205 may be made in any order other than the above, or the determination of part of these steps may be made simultaneously (in parallel). However, it should be noted that, when the determination of Steps S204 and S205 is made in this order, it is possible to make a determination of Step S205 only in the case where the translational motion model is used or where the prediction is made by the same models. This produces an effect of reducing a processing amount further.

The meaning of each of the conditions will be provided below.

(Step S201)

When the intra prediction is used, a prediction image is generated by computing adjacently-surrounding reconstructed images. Thus, the difference between an original image (an image before compression) and the prediction image is likely to be large. In this way, the block subjected to the intra prediction tends to involve an artificial distortion at the boundary between the prediction image of this block and its surroundings. Accordingly, the deblocking processing unit 101 determines that the deblocking processing is to be performed if the intra prediction is used.

(Step S202)

If there is a non-zero coefficient, namely, the prediction error is transmitted, the quantization is performed, so that the block boundary for transform processing tends to involve a quantization distortion. Thus, the deblocking processing unit 101 determines that the deblocking processing is to be performed if there is a non-zero coefficient and the boundary between the block P and the block Q coincides with the block boundary for transform processing.

It is noted that the deblocking processing unit 101 need not perform part or all of Steps S201 to S203 and S205, and may perform another determining process instead of part or all of these determining processes or in addition to these determining processes.

For example, the deblocking processing unit 101 may determine whether an image signal to be processed is an artificial image signal (for example, computer graphics or the like), instead of Step S201. In this case, the deblocking processing unit 101 determines that no deblocking processing is to be performed if the image signal to be processed is an artificial image signal.

Also, the deblocking processing unit 101 may determine whether the signal to be processed is a signal in a high frequency region, instead of Step S202. In a signal in the high frequency region, the quantization distortion is less likely to pose any visual problem. Accordingly, the deblocking processing unit 101 determines that no deblocking processing is to be performed if the signal to be processed is a signal in the high frequency region.

Moreover, the deblocking processing unit 101 may use a threshold other than one pixel in Step S205. Also, the deblocking processing unit 101 may use information other than the difference between the motion vectors itself to determine whether the difference between the motion vectors is predicted to be sufficiently small. For example, the deblocking processing unit 101 may use image characteristics to predict the difference between the motion vectors. In this case, the deblocking processing unit 101 determines that no deblocking processing is to be performed if the difference between the motion vectors is predicted to be sufficiently small.

Next, the description will be directed to the case where any of the above-described conditions is met, namely, it is not yet determined that no deblocking processing is to be performed.

In Step S206, the deblocking processing unit 101 determines whether the block P and the block Q have even pixel values (variations in pixel value are small). If the pixel values are uneven and the variations in pixel value are large (No in S206), the deblocking processing unit 101 determines that no deblocking processing is to be performed (S208).

Here, at the boundary between blocks with large pixel variations, there is significant variations in video. Thus, the deblocking processing causes only the boundary portion to be even, generating subjectively awkward video. In order to suppress this, the deblocking processing unit 101 determines that no deblocking processing is to be performed if variations in pixel value are large.

If determining that the pixel values are even (Yes in S206), the deblocking processing unit 101 determines whether there is any edge at the boundary between the block P and the block Q (S207). If there is already an edge at the block boundary (Yes in S207), the deblocking processing unit 101 determines that no deblocking processing is to be performed (S208). This is to avoid blurring the edge by carrying out the filtering on a portion that already has the edge.

On the other hand, if determining that there is no edge (No in S207), the deblocking processing unit 101 determines that the deblocking processing is to be performed (S209).

Incidentally, the determination of Step S206 is made using Formula 1 below as an example.

$$|P2_0 - 2 \times P1_0 + P0_0| + |P2_3 - 2 \times P1_3 + P0_3| +$$
$$|Q2_0 - 2 \times Q1_0 + Q0_0| + |Q2_3 - 2 \times Q1_3 + Q0_3| < \beta \quad \text{(Formula 1)}$$

Here, $P2_0$, $P1_0$, $P0_0$, $P2_3$, $P1_3$, and $P0_3$ denote pixel values of the block P. $Q2_0$, $Q1_0$, $Q0_0$, $Q2_3$, $Q1_3$, and $Q0_3$ denote pixel values of the block P.

Further, $\beta$ denotes a value varying according to a quantization parameter. $\beta$ increases when the quantization parameter is large, namely, the quantization error becomes larger. Consequently, it is more likely that Formula 1 is satisfied (the pixel values are determined to be even), resulting in a greater probability that the deblocking processing is determined to be performed.

If determining that no deblocking processing is to be performed (S208), the deblocking processing unit 101 does not perform any deblocking processing on the boundary between the block P and the block Q. If determining that the deblocking processing is to be performed (S209), the deblocking processing unit 101 performs the deblocking processing on the boundary between the block P and the block Q.

In the following, the non-translational motion model that is different from the translational motion model and used in the present embodiment will be described.

The non-translational motion model is affine transform, for example. The formula expressing the affine transform is shown by Formula 2.

$$\begin{bmatrix} x' \\ y' \\ 1 \end{bmatrix} = \begin{bmatrix} a & b & d_x \\ c & d & d_y \\ 0 & 0 & 1 \end{bmatrix} \begin{bmatrix} x \\ y \\ 1 \end{bmatrix} \quad \text{(Formula 2)}$$

When a=1, b=0, c=0 and d=1, Formula 2 is the same as the formula for the translational motion model. Moreover, the affine transform can make deformations such as rotation, enlargement, reduction, skewing and inversion. The following is an example of the case in which the translational motion model and a particular non-translational motion model are used simultaneously as the motion prediction models.

For the rotation, a, b, c, and d can be expressed by Formula 3. In this case, $\theta$ indicates a rotation angle.

$$\begin{bmatrix} x' \\ y' \\ 1 \end{bmatrix} = \begin{bmatrix} \cos\theta & -\sin\theta & d_x \\ \sin\theta & \cos\theta & d_y \\ 0 & 0 & 1 \end{bmatrix} \begin{bmatrix} x \\ y \\ 1 \end{bmatrix} \quad \text{(Formula 3)}$$

For the enlargement and the reduction, $a=S_x$, b=0, c=0, and $d=S_y$ are used as in Formula 4.

$$\begin{bmatrix} x' \\ y' \\ 1 \end{bmatrix} = \begin{bmatrix} S_x & 0 & d_x \\ 0 & S_y & d_y \\ 0 & 0 & 1 \end{bmatrix} \begin{bmatrix} x \\ y \\ 1 \end{bmatrix} \quad \text{(Formula 4)}$$

For the skewing in an x-axis direction, a=1, b=tan $\theta$, c=0 and d=1 are used as in Formula 5.

$$\begin{bmatrix} x' \\ y' \\ 1 \end{bmatrix} = \begin{bmatrix} 1 & \tan\theta & d_x \\ 0 & 1 & d_y \\ 0 & 0 & 1 \end{bmatrix} \begin{bmatrix} x \\ y \\ 1 \end{bmatrix} \quad \text{(Formula 5)}$$

For the skewing in a y-axis direction, a=1, b=0, c=tan $\theta$ and d=1 are used as in Formula 6.

$$\begin{bmatrix} x' \\ y' \\ 1 \end{bmatrix} = \begin{bmatrix} 1 & 0 & d_x \\ \tan\theta & 1 & d_y \\ 0 & 0 & 1 \end{bmatrix} \begin{bmatrix} x \\ y \\ 1 \end{bmatrix} \quad \text{(Formula 6)}$$

In the case where projective transformation is included, the formula for the affine transform is not sufficient. Thus, a transformation formula of Formula 7 is used. In this case, if the affine transform cannot be simplified to the motion prediction model mentioned above, the deblocking processing unit 101 may determine that the deblocking processing is to be performed.

$$\begin{bmatrix} x' \\ y' \\ 1 \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} x \\ y \\ 1 \end{bmatrix} \quad \text{(Formula 7)}$$

As described above, the non-translational motion is rotation, enlargement, reduction, skewing, inversion or the like.

Incidentally, in the non-translational motion model, a plurality of these transforms may be combined, or any one of or a plurality of these transforms and the translational motion may be combined. In other words, the non-translational motion model is a motion prediction model including at least one of rotation, enlargement, reduction, skewing and inversion.

In the above description, the deblocking processing unit 101 has determined whether to perform the deblocking processing according to whether the non-translational motion model is used. However, the deblocking processing unit 101 also may determine whether to perform the deblocking processing according to whether the block P and the block Q make adjacent reference.

Figure 5:
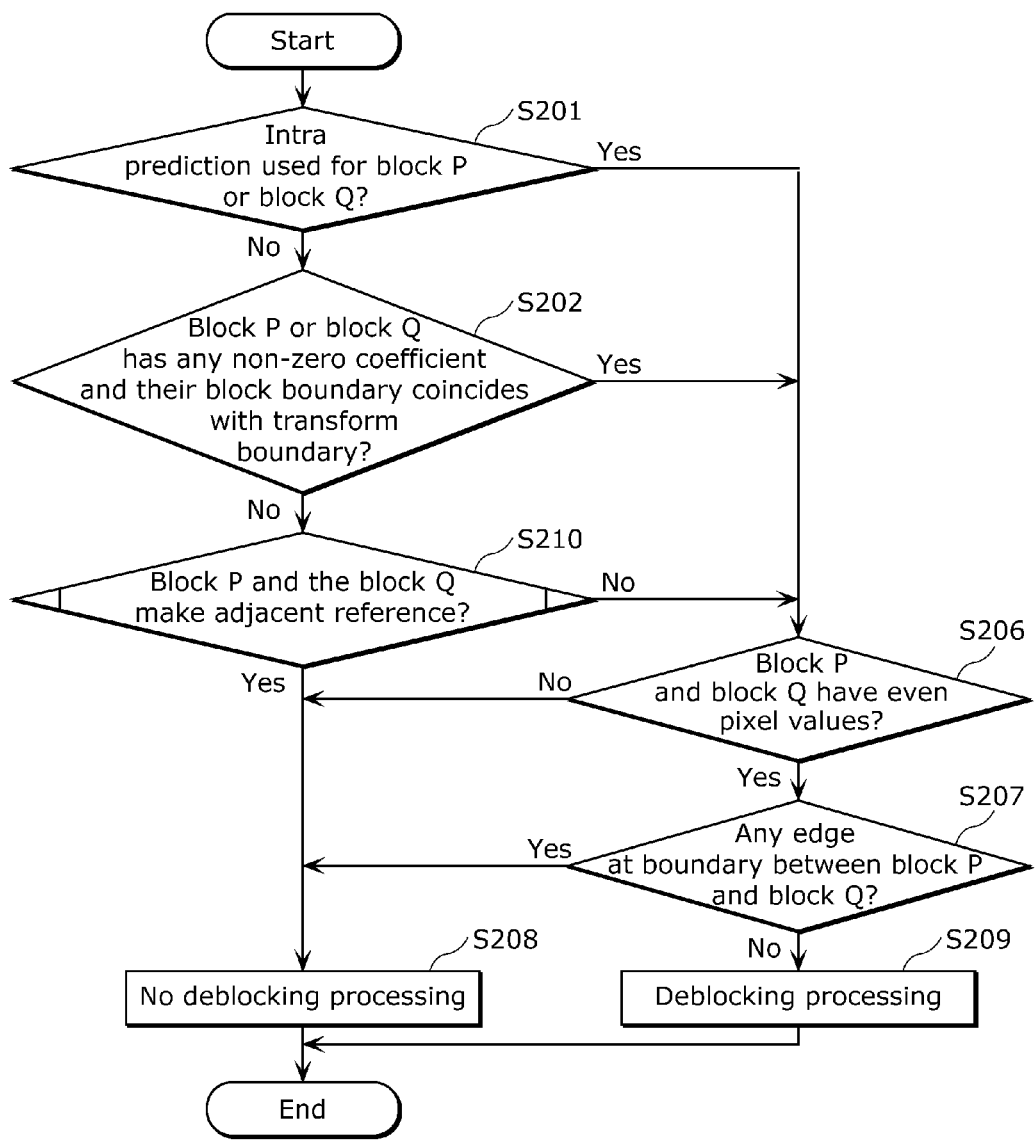
FIG. 5 is a flowchart showing a variation of the execution determining process of the deblocking processing according to Embodiment 1.

FIG. 5 is a flowchart showing the operation of the deblocking processing unit 101 in this case. The process shown in FIG. 5 is different from that shown in FIG. 4 in that Steps S203 to S205 are replaced with Step S210.

In Step S210, the deblocking processing unit 101 determines whether the block P and the block Q make adjacent reference. If the block P and the block Q make adjacent reference (Yes in S210), the deblocking processing unit 101 determines that no deblocking processing is to be performed (S208). On the other hand, if the block P and the block Q do not make adjacent reference (No in S210), the deblocking processing unit 101 determines that the deblocking processing is to be performed, and proceeds to Step S206.

Figure 6:
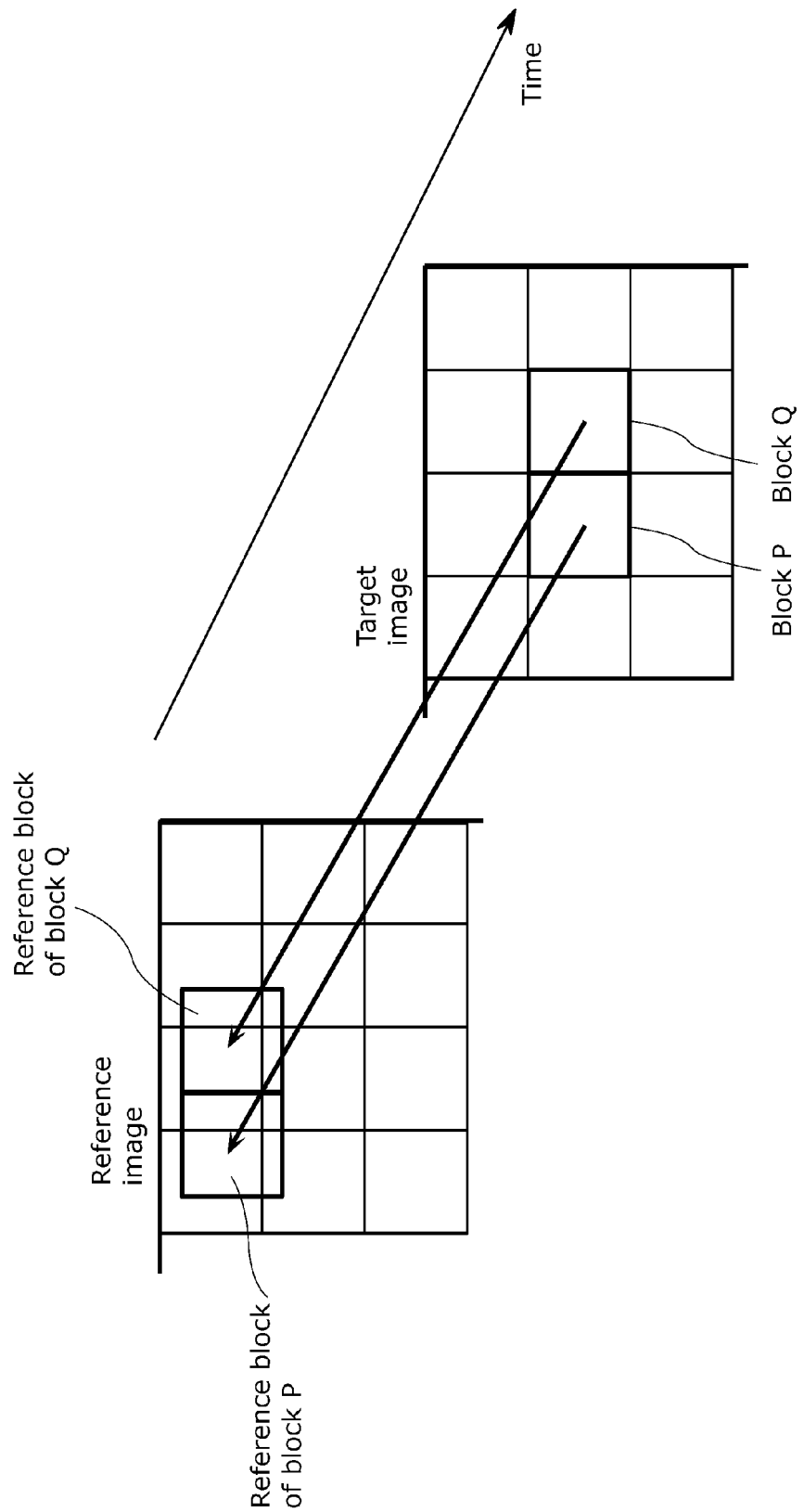
FIG. 6 is a diagram for describing adjacent reference in Embodiment 1.
Figure 7:
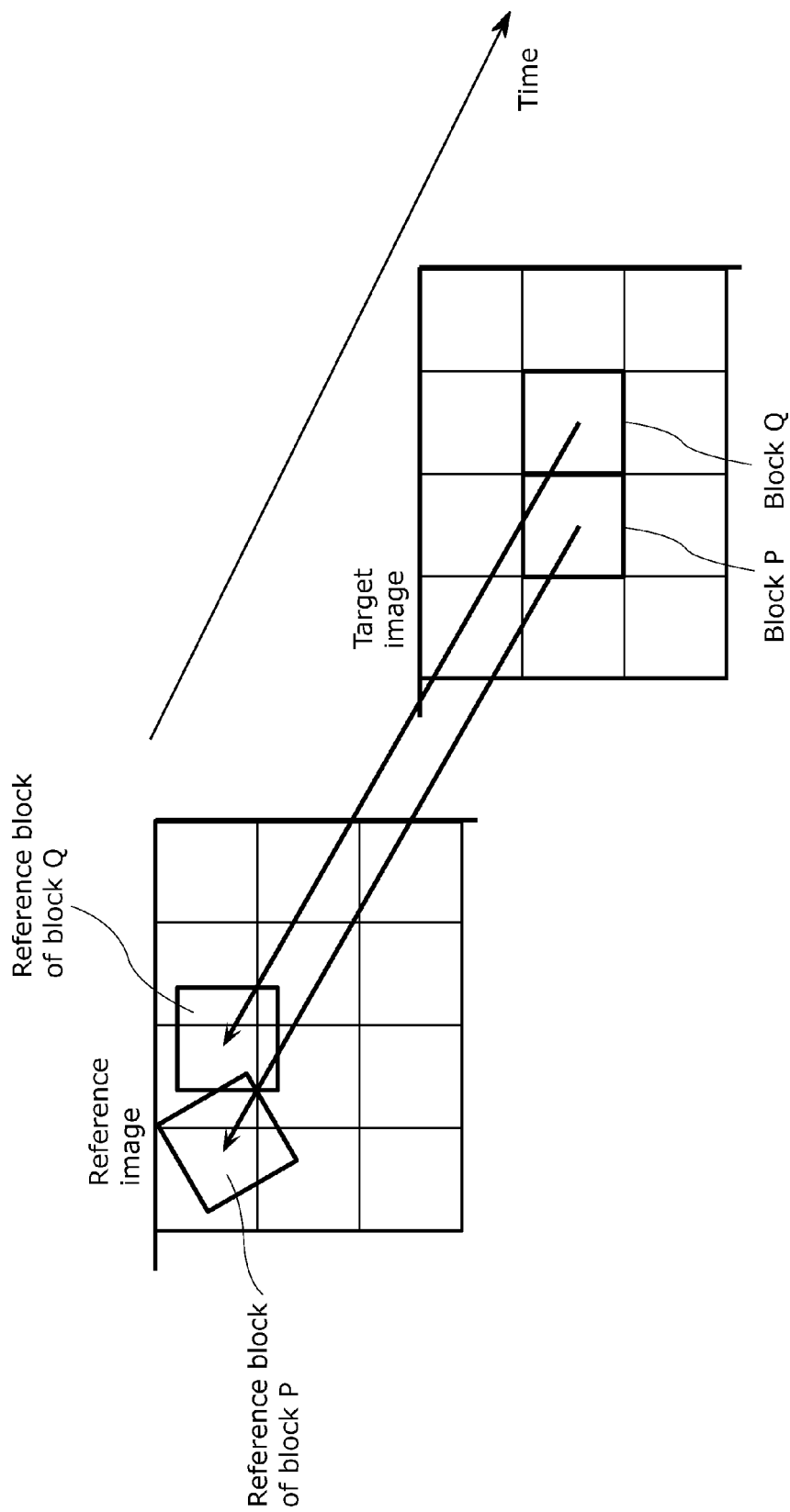
FIG. 7 is a diagram for describing adjacent reference in Embodiment 1.

FIG. 6 shows the relationship between reference blocks in the case where the blocks P and Q make adjacent reference. Also, FIG. 7 shows the relationship between reference blocks in the case where the blocks P and Q do not make adjacent reference.

The case of the blocks P and Q making adjacent reference is that where, as shown in FIG. 6, the reference block of the block P and the reference block of the block Q are included in the same reference image and adjacent to each other, with their boundaries coinciding with each other. Here, the boundaries coinciding with each other means one side of the reference block of the block P and one side of the reference block of the block Q coinciding with each other.

In the case of such adjacent reference, since the reference blocks are adjacent to each other, a boundary distortion is not generated easily. Thus, the deblocking processing unit 101 determines that no deblocking processing is to be performed in the case of the adjacent reference.

Incidentally, one side of the reference block of the block P and one side of the reference block of the block Q coinciding with each other also includes the case where these two sides substantially coincide with (are close to) each other. For example, the case of one side of the block P and one side of the block Q coinciding with each other may be that the distance between these two sides (for example, a maximum value of the distance between the two sides) is less than one pixel.

Also, as shown in FIG. 7, when the non-translational motion model (rotation in this example) is used for the block P, the block P and the block Q do not make adjacent reference.

Figure 8:
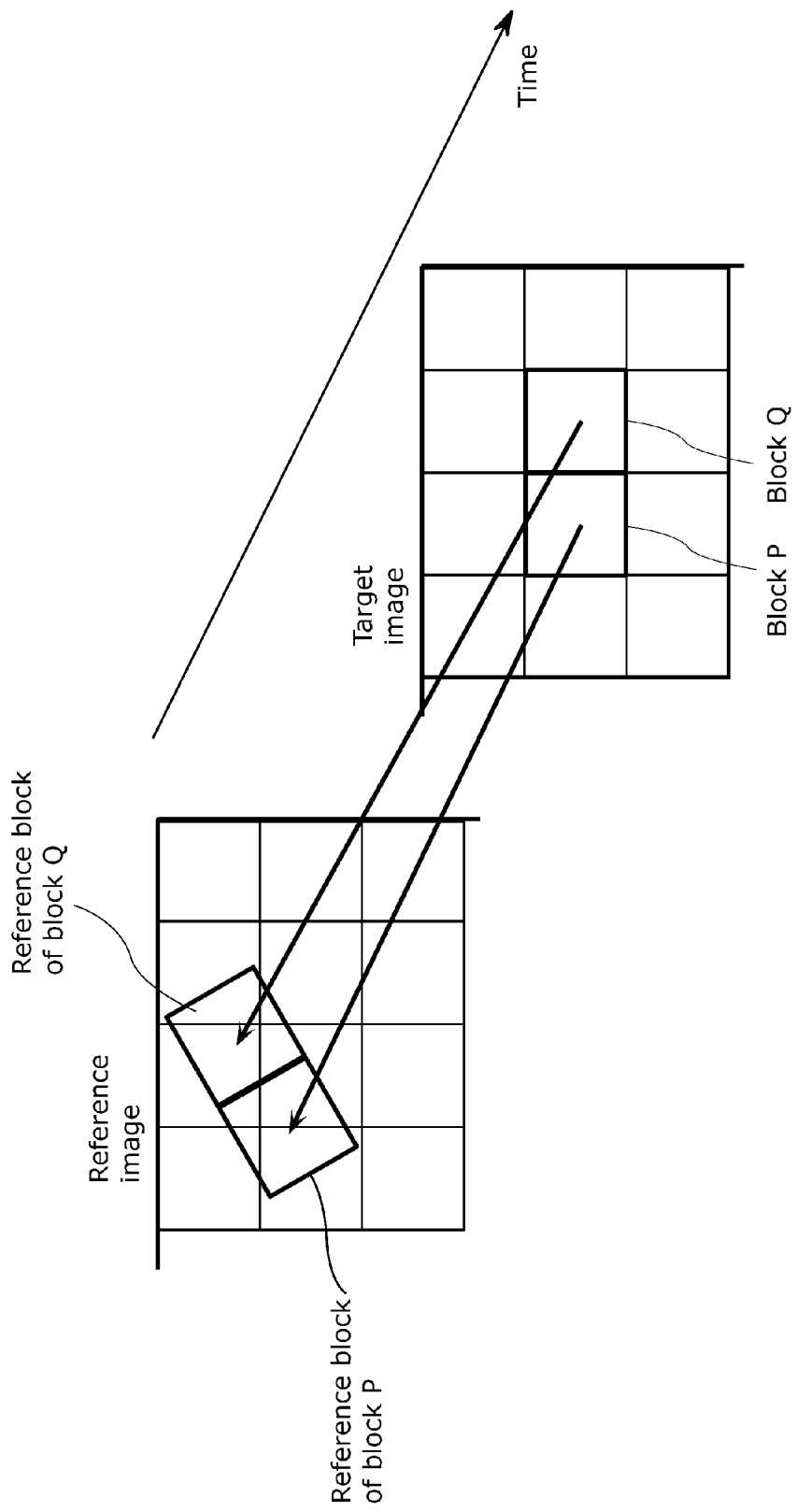
FIG. 8 is a diagram for describing adjacent reference in Embodiment 1.

Further, FIG. 8 illustrates an example of the adjacent reference when the non-translational motion model is used. As shown in FIG. 8, even when the non-translational motion model is used, there is a case of the adjacent reference. In such a case, the deblocking processing is not necessary. Thus, the deblocking processing unit 101 determines that no deblocking processing is to be performed.

Figure 9:
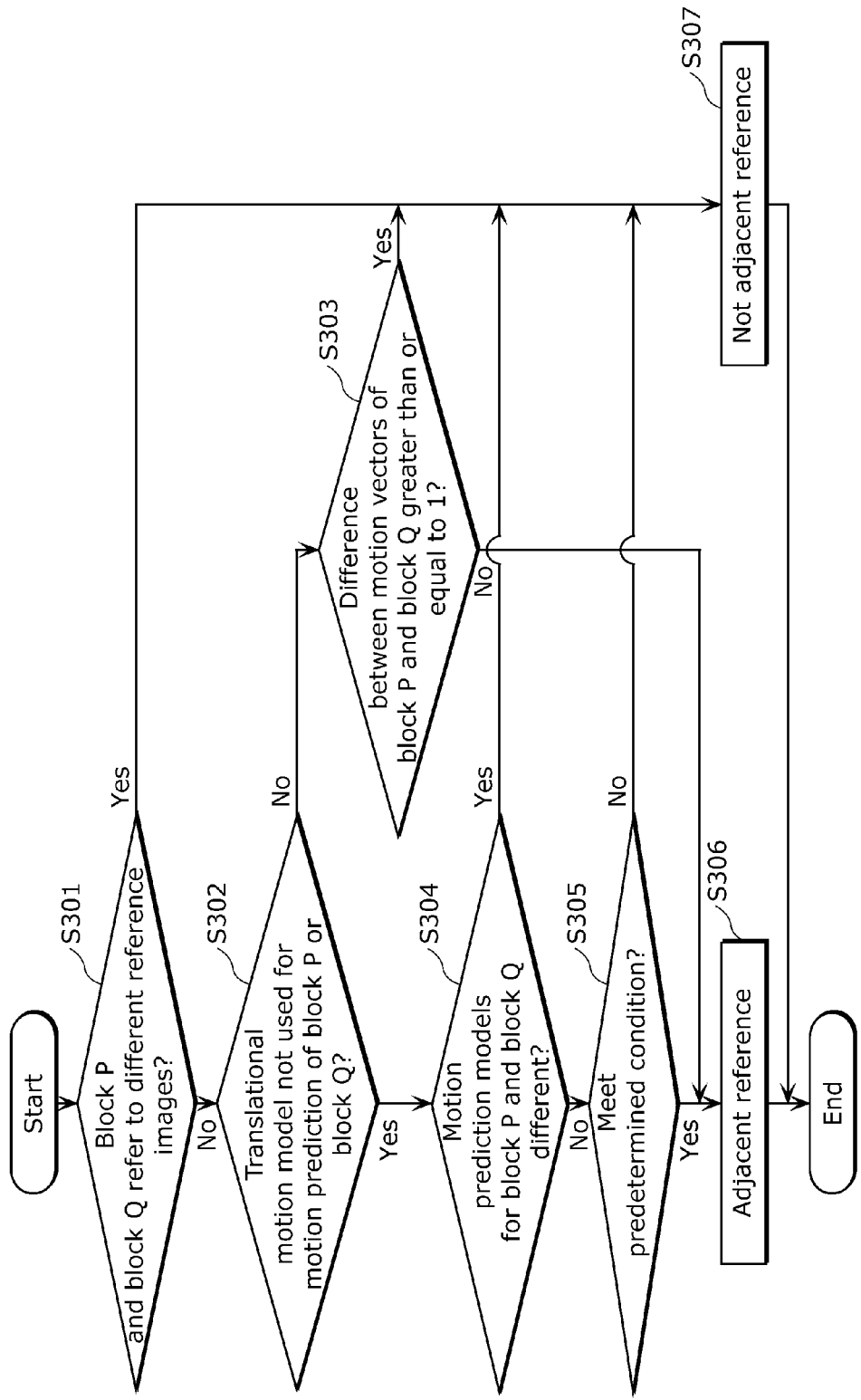
FIG. 9 is a flowchart showing an adjacent reference determining process in a variation of the execution determining process of the deblocking processing according to Embodiment 1.

The following is a detailed description of a process of determining the adjacent reference (S210). FIG. 9 is a flowchart showing the adjacent reference determining process.

First, the deblocking processing unit 101 determines whether reference images of the block P and the block Q are different (S301). If the reference images are different (Yes in S301), the deblocking processing unit 101 determines that the blocks do not make the adjacent reference (S307).

On the other hand, if the reference images are the same (No in S301), the deblocking processing unit 101 determines whether the non-translational motion model has been used in the prediction of at least one of the block P and the block Q (S302).

If the translational motion model has been used for both of the block P and the block Q (No in S302), the deblocking processing unit 101 determines whether an absolute value of the difference between the motion vectors of the block P and the block Q is greater than or equal to 1 (S303).

If the absolute value of the difference is greater than or equal to 1 (Yes in S303), the deblocking processing unit 101 determines that the blocks do not make the adjacent reference (S307). On the other hand, if the absolute value of the difference is less than 1 (No in S303), the deblocking processing unit 101 determines that the blocks make the adjacent reference (S306).

If the non-translational motion model has been used for the prediction of at least one of the block P and the block Q (Yes in S302), the deblocking processing unit 101 determines whether the motion prediction models used for the block P and the block Q are different (S304).

More specifically, if the translational motion model is used for one of the block P and the block Q and the non-translational motion model is used for the other, the deblocking processing unit 101 determines that the motion prediction models are different. Furthermore, even when the non-translational motion model (for example, the affine transform) is used for both of the block P and the block Q, the deblocking processing unit 101 determines that the motion prediction models are different if kinds of transform (rotation, enlargement, etc.) are different.

It should be noted that the deblocking processing unit 101 may determine that the motion prediction models are the same without determining the kinds of transform of the non-translational motion model if the non-translational motion model is used for both of the block P and the block Q.

If the motion prediction models are different (Yes in S304), the deblocking processing unit 101 determines that the blocks do not make the adjacent reference (S307). If the motion prediction models are different as described above, the two reference blocks are not likely to be continuous. Thus, the deblocking processing unit 101 performs the deblocking processing in such a case.

On the other hand, if the motion prediction models are the same (No in S304), it is determined whether motions of the block P and the block Q meet a predetermined condition for the adjacent reference (S305). If the predetermined condition is met (Yes in S305), the deblocking processing unit 101 determines that the blocks make the adjacent reference (S306). On the other hand, if the predetermined condition is not met (No in S305), the deblocking processing unit 101 determines that the blocks do not make the adjacent reference (S307).

FIG. 10 is a table for describing the process of determining the adjacent reference when the non-translational motion model is used for the block P and the block Q, and illustrates an exemplary case in which the blocks are determined to make the adjacent reference.

As shown in FIG. 10, when a combination of the rotation angle θ and the translational motion is used for the prediction of the block P and the block Q is adjacent to the right side of the block P, it is determined that the blocks make the adjacent reference if the rotation angle θ that is the same as the rotation angle of the block P and the translational motion shown in FIG. 10 are used for the prediction of the block Q. When the block Q is adjacent to the lower side of the block P, it is determined that the blocks make the adjacent reference if the rotation angle θ that is the same as the rotation angle of the block P and the translational motion are used for the prediction of the block Q Also, when a combination of the enlargement and reduction and the translational motion is used for the prediction of the block P, it is determined that the blocks make the adjacent reference if the conditions shown in FIG. 10 are met in the respective cases where the block Q is adjacent to the right side and the lower side of the block P.

Likewise, in the cases of the skewing in the x-axis direction and the skewing in the y-axis direction, it is determined that the blocks make the adjacent reference if the conditions shown in FIG. 10 are met. It should be noted that θ' shown in FIG. 10 indicates an arbitrary angle. In other words, θ' may be set to 0°. This means that the skewing does not need to be used for that block.

Incidentally, the motion examples illustrated here may be treated as different motion prediction models or may be combined and treated as the affine transform.

Further, when only the translational motion is used, the same condition for the deblocking processing is used regardless of whether the block P and the block Q are adjacent along an up-down direction (a vertical direction) or a right-left direction (a horizontal direction). On the other hand, in determining whether to perform the deblocking processing in the present embodiment, different conditions (different computation methods) are used to determine the adjacent reference according to whether the block P and the block Q are adjacent to each other in the vertical direction or the horizontal direction, as shown in FIG. 10.

In this manner, even when the inter prediction including the motion prediction model different from the translational motion model is used, it is possible to appropriately determine whether to execute the deblocking processing. This suppresses a subjective image quality degradation caused by over-filtering and reduces the block distortion.

Figure 11:
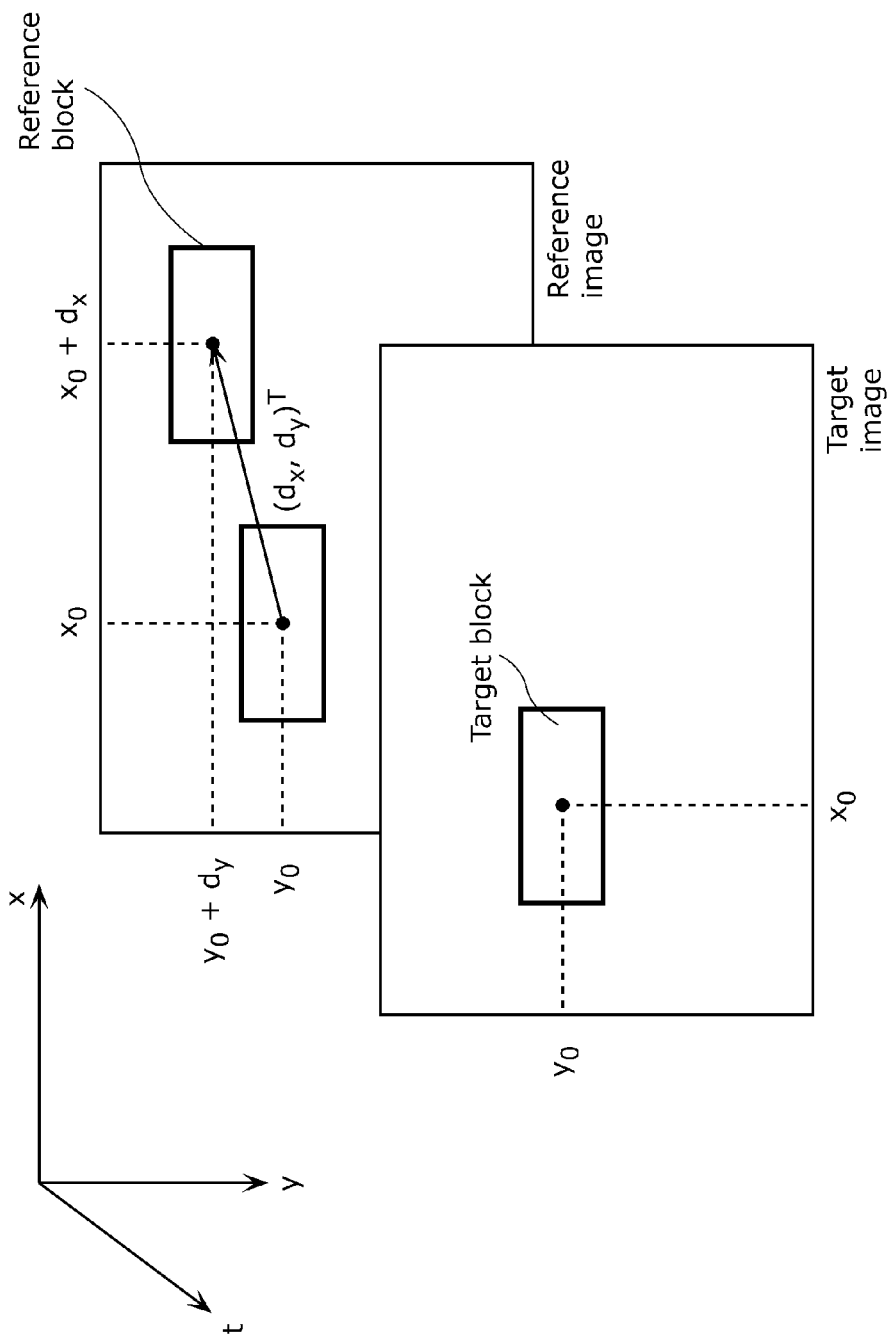
FIG. 11 is a diagram for describing a reference relationship in the case of using a translational motion model according to Embodiment 1.

Here, in the translational motion model, when the coordinates of the target block are $(x_0, y_0)^T$ and a displacement vector (a motion vector) is $(d_x, d_y)^T$ as shown in FIG. 11, the coordinates of the reference block are expressed by $(x_0+d_x, y_0+d_y)^T$.

Figure 12:
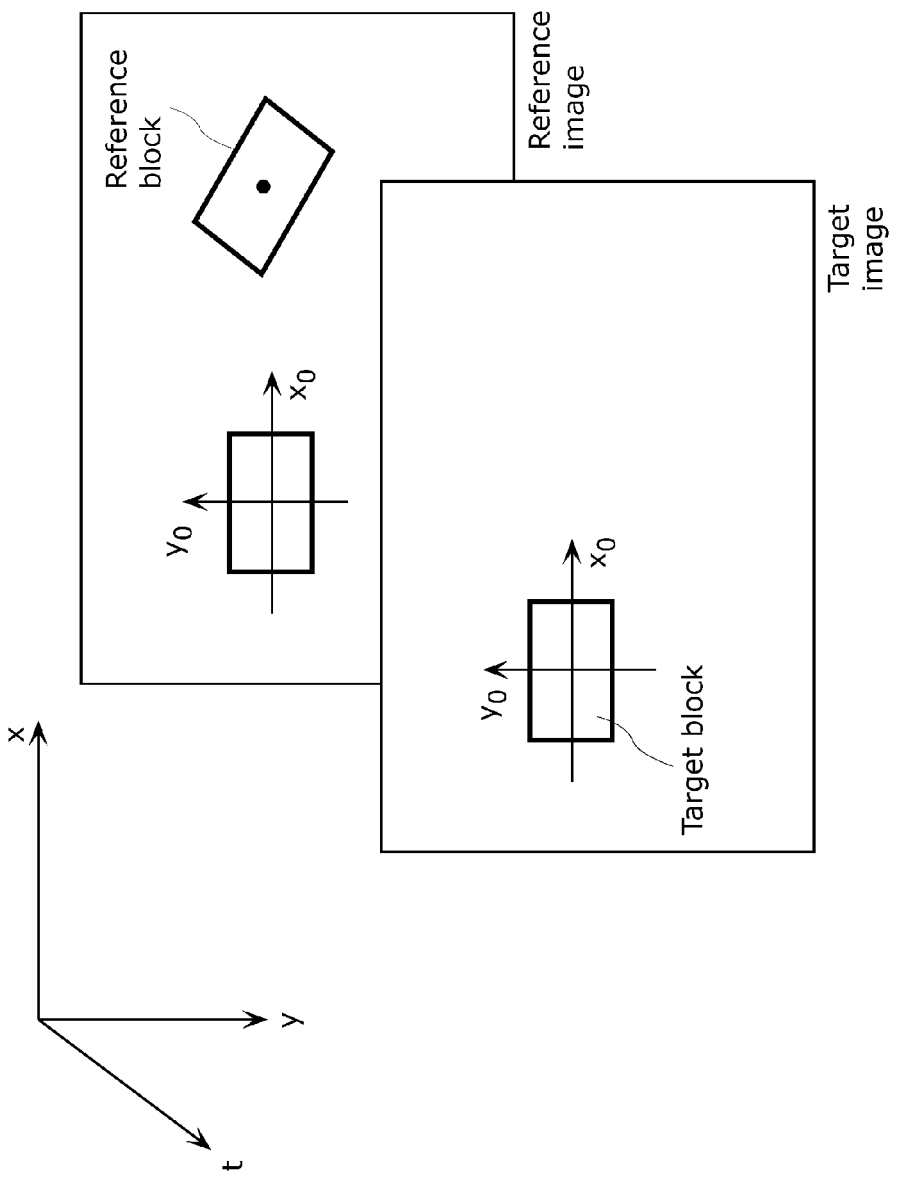
FIG. 12 is a diagram for describing a reference relationship in the case of using a non-translational motion model according to Embodiment 1.

Also, in the affine transform, when the coordinates of the target block are $(x_0, y_0)^T$ and components of a vector description of an affine motion model (a motion vector) are $(d_x, d_y, a_1, a_2, a_3, a_4)^T$ as shown in FIG. 12, the coordinates of the reference block are expressed by $(x_0+d_x+a_1 \cdot x_0+a_2 \cdot y_0, y_0+d_y+a_3 \cdot x_0+a_4 \cdot y_0)^T$.

Figure 13:
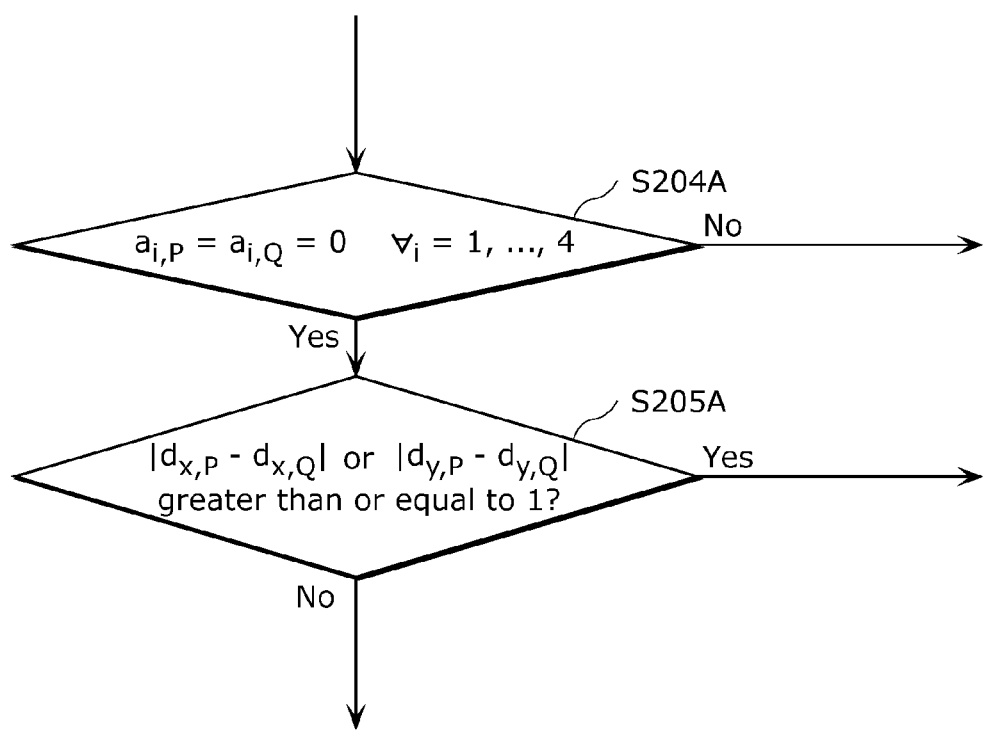
FIG. 13 is a flowchart showing a variation of the determining process according to Embodiment 1.

Here, when the motion vector of the block P is $(d_{x,P}, d_{y,P}, a_{1,P}, a_{2,P}, a_{3,P}, a_{4,P})^T$ and the motion vector of the block Q is $(d_{x,Q}, d_{y,Q}, a_{1,Q}, a_{2,Q}, a_{3,Q}, a_{4,Q})^T$, the determining processes of Steps S204 and S205 shown in FIG. 4 can be realized by computing Steps S204A and S205A shown in FIG. 13.

In other words, in Step S204A, the deblocking processing unit 101 determines that both of the motion prediction models of the block P and the block Q are the translational motion model if all of $a_{1,P}, a_{1,Q}, a_{2,P}, a_{2,Q}, a_{3,P}, a_{3,Q}, a_{4,P}$, and $a_{4,Q}$ are zero (Yes in S204A), and otherwise (No in S204A), determines that at least one of the motion prediction models of the block P and the block Q is the non-translational motion model.

Further, in Step S205A, the deblocking processing unit 101 determines that the difference between the motion vectors of the block P and the block Q is greater than or equal to 1 if at least one of an absolute value of the difference between $d_{x,P}$ and $d_{x,Q}$ and an absolute value of the difference between $d_{y,P}$ and $d_{y,Q}$ is greater than or equal to 1 (Yes in S205A), and otherwise (No in S205A), determines that the difference between the motion vectors of the block P and the block Q is less than 1.

Figure 14:
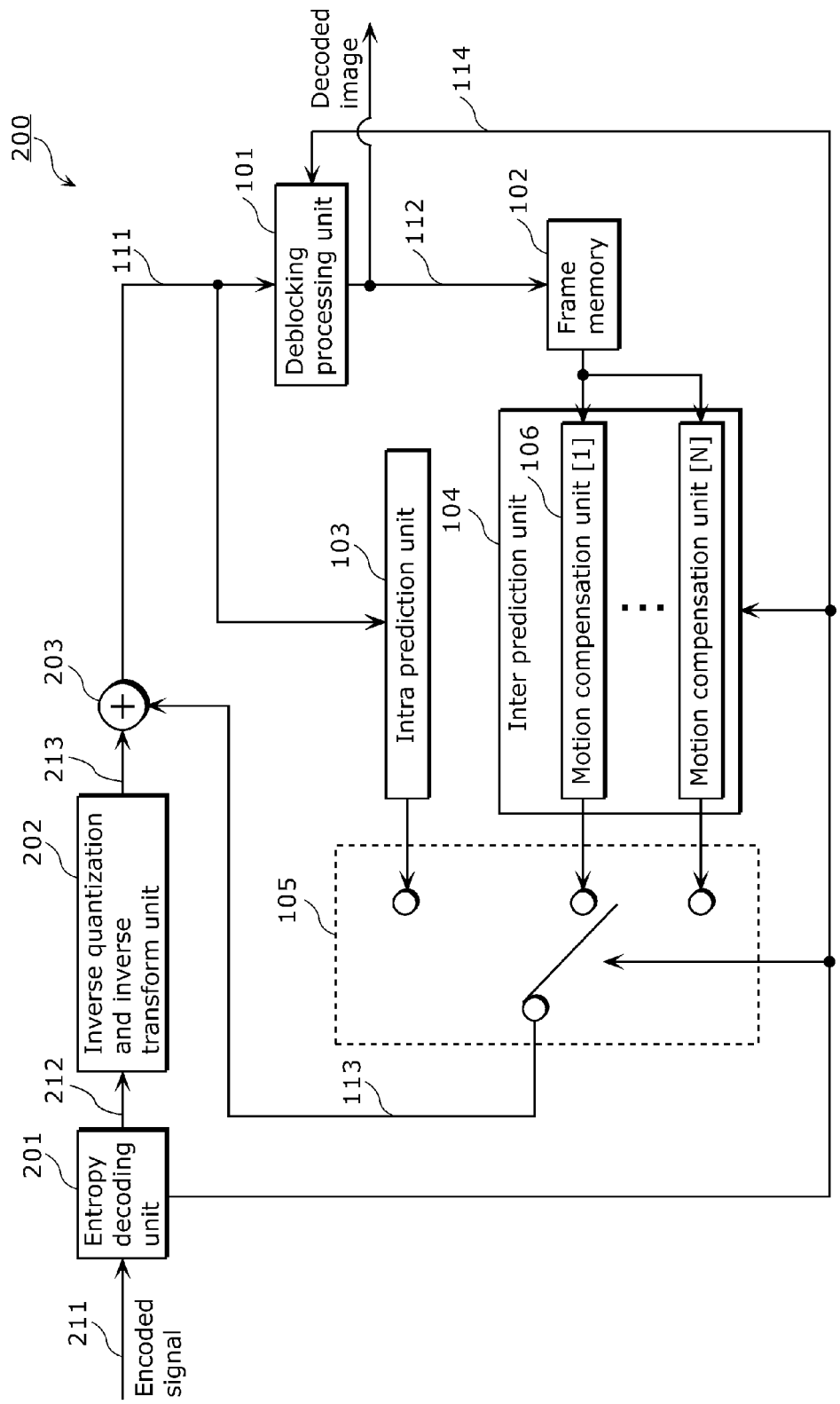
FIG. 14 is a block diagram illustrating an exemplary configuration of an image decoding apparatus according to Embodiment 1.

It should be noted that the deblocking processing device 100 according to the present embodiment is included in an image decoding apparatus 200 that decodes an encoded signal (an encoded image) obtained by compression-encoding an image. FIG. 14 is a block diagram illustrating an exemplary configuration of the image decoding apparatus 200 according to the present embodiment.

The image decoding apparatus 200 generates a decoded image 112 by decoding an encoded signal 211 obtained by compression-encoding an image. For example, the encoded signal 211 is inputted as a signal to be decoded to the image decoding apparatus 200 on a block-by-block basis. The image decoding apparatus 200 performs variable length decoding, inverse quantization and inverse transform on the inputted signal to be decoded, thereby generating the decoded image 112.

As shown in FIG. 14, the image decoding apparatus 200 includes an entropy decoding unit 201, an inverse quantization and inverse transform unit 202, an adder 203, a deblocking processing unit 101, a frame memory 102, an intra prediction unit 103, an inter prediction unit 104 and a selecting unit 105.

Here, the deblocking processing unit 101, the frame memory 102, the intra prediction unit 103, the inter prediction unit 104 and the selecting unit 105 are the same as the respective processing units included in the deblocking processing device 100 described above.

The entropy decoding unit 201 performs variable length decoding on the encoded signal 211 (encoded bit stream) to reconstruct a quantization coefficient 212. It should be noted that these decoding processes are carried out block by block, which is obtained by dividing an image, and data for each block is inputted sequentially to the entropy decoding unit 201. Also, the entropy decoding unit 201 obtains prediction information 114 (motion data) from the encoded signal 211 and outputs the obtained prediction information 114 to the inter prediction unit 104.

The inverse quantization and inverse transform unit 202 performs inverse quantization on the quantization coefficient 212 reconstructed by the entropy decoding unit 201, thereby reconstructing a transform coefficient. Then, the inverse quantization and inverse transform unit 202 performs inverse transform on the reconstructed transform coefficient, thereby reconstructing a prediction error 213 (a prediction residual signal).

The adder 203 adds the reconstructed prediction error 213 to prediction image 113, thereby generating a reconstructed image 111.

The deblocking processing unit 101 performs deblocking processing on the reconstructed image 111 to generate a decoded image 112. The decoded image 112 is outputted as a decoded signal to a device external to the image decoding apparatus 200. Incidentally, this deblocking processing also includes the above-described process of determining whether to execute the deblocking processing.

The frame memory 102 is a memory for storing a reference image used for motion compensation. More specifically, the frame memory 102 stores the decoded image 112.

The intra prediction unit 103 performs intra prediction so as to generate a prediction image (an intra prediction image). More specifically, the intra prediction unit 103 performs the intra prediction with reference to an image surrounding a block to be decoded (an input signal) in the reconstructed image 111, thereby generating the intra prediction image.

The inter prediction unit 104 performs the motion compensation based on the prediction information 114 outputted from the entropy decoding unit 201, thereby generating a prediction image (an inter prediction image).

The selecting unit 105 selects either the intra prediction image or the inter prediction image, and outputs the selected image to the adder 203 as the prediction image 113.

With the above configuration, the image decoding apparatus 200 according to the present embodiment decodes the compression-encoded image data.

Figure 15:
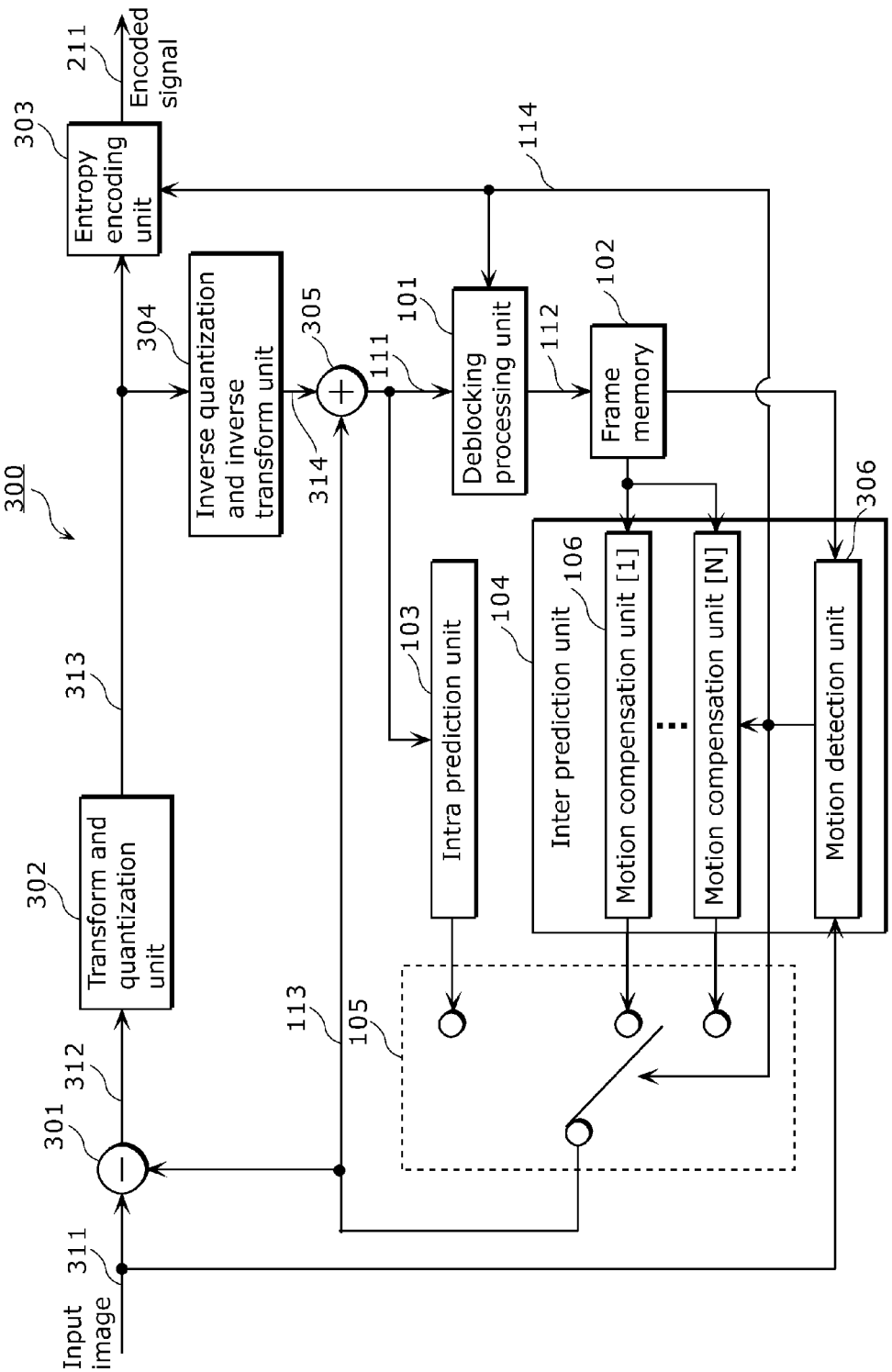
FIG. 15 is a block diagram illustrating an exemplary configuration of an image encoding apparatus according to Embodiment 1.

Also, the deblocking processing device 100 may be included in an image encoding apparatus that encodes an image. FIG. 15 is a block diagram illustrating a configuration of an image encoding apparatus 300 according to the present embodiment. The image encoding apparatus 300 shown in FIG. 15 encodes an input image 311, thereby generating an encoded signal 211. This image encoding apparatus 300 includes a subtractor 301, a transform and quantization unit 302, an entropy encoding unit 303, an inverse quantization and inverse transform unit 304, an adder 305, a deblocking processing unit 101, a frame memory 102, an intra prediction unit 103, an inter prediction unit 104A and a selecting unit 105.

Here, the deblocking processing unit 101, the frame memory 102, the intra prediction unit 103 and the selecting unit 105 are the same as the respective processing units included in the deblocking processing device 100 described above. Also, the inter prediction unit 104A includes a motion detection unit 306 in addition to the structural components of the inter prediction unit 104.

The subtractor 301 calculates a prediction error 312, which is the difference between the input image 311 and the prediction image 113.

The transform and quantization unit 302 transforms the prediction error 312 in a spatial domain to generate a transform coefficient in a frequency domain. For example, the transform and quantization unit 302 performs DCT (Discrete Cosine Transform) on the prediction error, thereby generating the transform coefficient. Further, the transform and quantization unit 302 quantizes the generated transform coefficient so as to generate a quantization coefficient 313.

The entropy encoding unit 303 performs variable length encoding on the quantization coefficient 313, thereby generating an encoded signal 211. Further, the entropy encoding unit 303 encodes the prediction information 114 detected by the motion detection unit 306 (for example, information indicating the motion vector and the selected motion prediction model), and outputs the encoded signal 211 including the encoded prediction information 114.

The inverse quantization and inverse transform unit 304 performs inverse quantization on the quantization coefficient 313 so as to reconstruct a transform coefficient. Further, the inverse quantization and inverse transform unit 304 performs inverse transform on the reconstructed transform coefficient, thereby reconstructing a prediction error 314.

Incidentally, the reconstructed prediction error 314 does not coincide with the prediction error 312 generated by the subtractor 301 because information has been lost by the quantization. In other words, the reconstructed prediction error 314 contains a quantization error.

The adder 305 adds the prediction error 314 to the prediction image 113, thereby generating a reconstructed image 111 (a locally decoded image).

The deblocking processing unit 101 performs deblocking processing on the generated reconstructed image 111 to generate a decoded image 112.

The frame memory 102 is a memory for storing a reference image used for motion compensation. More specifically, the frame memory 102 stores the decoded image 112.

The intra prediction unit 103 performs intra prediction so as to generate a prediction image (an intra prediction image). More specifically, the intra prediction unit 103 performs the intra prediction with reference to an image surrounding a block to be encoded (an input signal) in the reconstructed image 111 generated by the adder 305, thereby generating the intra prediction image.

The motion detection unit 306 detects prediction information 114 indicating motion between the input image 311 and the reference image stored in the frame memory 102 (for example, information indicating the motion vector and the selected motion prediction model).

The motion compensation unit 106 performs motion compensation based on the detected prediction information 114, thereby generating a prediction image (an inter prediction image).

The selecting unit 105 selects either the intra prediction image or the inter prediction image, and outputs the selected image to the subtractor 301 and the adder 305 as the prediction image 113.

With the above-described configuration, the image encoding apparatus 300 according to the present embodiment compression-encodes the image data (the input image 311), thereby generating an encoded signal 211.

Figure 16:
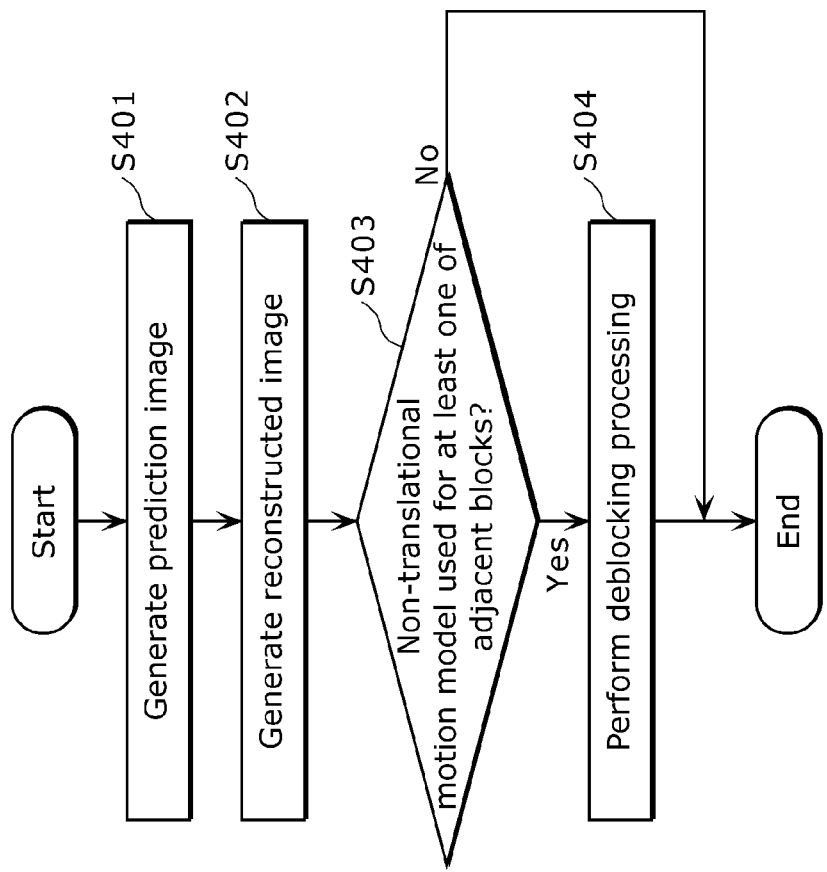
FIG. 16 is a flowchart showing an image decoding process or an image encoding process according to Embodiment 1.

As described above, the image decoding apparatus 200 and the image encoding apparatus 300 according to the present embodiment perform processes shown in FIG. 16.

First, the operation of the image decoding apparatus 200 will be described.

For each of blocks in an image, the image decoding apparatus 200 selects one motion prediction model from a plurality of motion prediction models including a translational motion model and a non-translational motion model different from the translational motion model. More specifically, the image decoding apparatus 200 selects a motion prediction model indicated by the prediction information 114 included in the encoded signal 211. Then, the image decoding apparatus 200 performs motion prediction using the selected motion prediction model to generate a prediction image 113 for each of the blocks (S401).

Next, the image decoding apparatus 200 decodes the encoded image (the encoded signal 211) to generate a reconstructed image 111 for each of the blocks using the prediction image 113 (S402). More specifically, the image decoding apparatus 200 performs entropy decoding (variable length decoding) on the encoded image so as to generate a quantization coefficient 212. Subsequently, the image decoding apparatus 200 performs inverse quantization and inverse transform on the quantization coefficient 212, thereby generating a prediction error 213. Next, the image decoding apparatus 200 adds the prediction error 213 to the prediction image 113, thereby generating the reconstructed image 111.

Then, the image decoding apparatus 200 determines whether the non-translational motion model is selected for at least one of a first block and a second block, where the first block is one of the above-mentioned blocks, and the second block is another one of the blocks and adjacent to the first block (S403). The image decoding apparatus 200 determines that filtering (deblocking processing) is to be performed if the non-translational motion model is selected for at least one of the first block and the second block (Yes in S403). On the other hand, the image decoding apparatus 200 determines that no filtering (deblocking processing) is to be performed if the non-translational motion model is not selected for at least one of the first block and the second block, namely, the translational motion model is selected for both of the first block and the second block (No in S403).

If it is determined that the filtering is to be performed (Yes in S403), the image decoding apparatus 200 performs filtering (deblocking processing) on a boundary between the reconstructed image 111 for the first block and the reconstructed image 111 for the second block for reducing an image distortion at the boundary (S404). If it is determined that no filtering is to be performed (No in S403), the image decoding apparatus 200 does not perform filtering (deblocking processing) on the boundary between the reconstructed image 111 for the first block and the reconstructed image 111 for the second block for reducing an image distortion at the boundary.

Hereinafter, the operation of the image encoding apparatus 300 will be described.

For each of blocks in an image, the image encoding apparatus 300 selects one motion prediction model from a plurality of motion prediction models including a translational motion model and a non-translational motion model different from the translational motion model. More specifically, the image encoding apparatus 300 performs motion detection, thereby determining a motion prediction model to be used. For example, the image encoding apparatus 300 selects a motion prediction model having the highest encoding efficiency (the lowest encoding cost). Then, the image encoding apparatus 300 performs motion prediction using the selected motion prediction model to generate a prediction image 113 for each of the blocks (S401).

Next, the image encoding apparatus 300 encodes and decodes the input image 311 to generate a reconstructed image 111 for each of the blocks using the prediction image 113 (S402). More specifically, the image encoding apparatus 300 calculates a prediction error 312, which is the difference between the input image 311 and the prediction image 113. Next, the image encoding apparatus 300 performs transform and quantization on the prediction error 312, thereby calculating a quantization coefficient 313. Subsequently, the image encoding apparatus 300 performs inverse quantization and inverse transform on the quantization coefficient 313, thereby generating a prediction error 314. Next, the image encoding apparatus 300 adds the prediction error 314 to the prediction image 113, thereby generating the reconstructed image 111.

Then, the image encoding apparatus 300 determines whether the non-translational motion model is selected for at least one of a first block and a second block, where the first block is one of the above-mentioned blocks, and the second block is another one of the blocks and adjacent to the first block (S403). The image encoding apparatus 300 determines that filtering (deblocking processing) is to be performed if the non-translational motion model is selected for at least one of the first block and the second block (Yes in S403). On the other hand, the image encoding apparatus 300 determines that no filtering (deblocking processing) is to be performed if the non-translational motion model is not selected for at least one of the first block and the second block, namely, the translational motion model is selected for both of the first block and the second block (No in S403).

If it is determined that the filtering is to be performed (Yes in S403), the image encoding apparatus 300 performs filtering (deblocking processing) on a boundary between the reconstructed image 111 for the first block and the reconstructed image 111 for the second block for reducing an image distortion at the boundary (S404). If it is determined that no filtering is to be performed (No in S403), the image encoding apparatus 300 does not perform filtering (deblocking processing) on the boundary between the reconstructed image 111 for the first block and the reconstructed image 111 for the second block for reducing an image distortion at the boundary.

As described above, the image decoding apparatus 200 and the image decoding method as well as the image encoding apparatus 300 and the image encoding method according to the present embodiment can determine whether to execute the deblocking processing in an appropriate manner.

Although the determining methods corresponding to the different kinds of motion compensation (motion prediction) have been described above, there is no particular limitation to them. For example, by defining the rotation transform θ in stages, respectively assigning these stages with prediction mode numbers and defining the process to execute the deblocking processing if these numbers are not matched, it is possible to reduce a processing amount necessary for the determining process. Similarly, for the enlargement and reduction other than the rotation transform, an enlargement ratio (a reduction ratio) can be defined as the mode.

Although the present embodiment has been directed to the description of the case in which various motion prediction modes are used, there is no particular limitation to this. Only part of the above-noted motion prediction modes may be used.

Also, the formula for the affine transform or the projective transformation may be defined, and based on the motion prediction parameter used in that formula, whether the translational motion model is selected may be determined.

Further, if no translational motion model is selected, it may be determined that the deblocking processing is performed immediately. Accordingly, over-filtering or lack of filtering where necessary can be avoided as much as possible. In addition, it is possible to reduce processing necessary for determination.

It should be noted that the feature of the present embodiment can be maintained even when the modifications described above are made.

Incidentally, the encoded signal may include information indicating which conditions with respect to a plurality of motion prediction models should be met when executing the deblocking processing. For example, this information may be stored in a header (for example, a slice header, a picture header, a sequence header, VUI or SEI) that stores information used in common among a plurality of blocks. This makes it possible to, for example, reduce the determining process in an environment where the processing amount is limited, and give a higher priority to image quality when a large processing amount is available.

Incidentally, as the method for transmitting the motion information (prediction information 114), a method of transmitting a difference value in motion information between the adjacent blocks has been known. When different motion models are used as in the present embodiment, the difference value in motion information can be calculated as follows, for example. When the motion prediction model for a target block and the motion prediction model for an adjacent block that is adjacent to the target block are different, information including the difference value between corresponding elements and information of different elements is transmitted. In this manner, it is possible to transmit the motion information with a small information amount. For example, when the combination of translational motion, rotation and enlargement is used for the target block and the translational motion and the rotation are used for the adjacent block, the difference in parameter in the translational motion, the difference in parameter in the rotation and the enlargement parameter itself are transmitted.

The above description has been directed to the image decoding apparatus and the image encoding apparatus according to an embodiment of the present disclosure. However, the present disclosure is not limited to this embodiment.

Also, each of the processing units included in the image decoding apparatus or the image encoding apparatus according to the above-described embodiment is typically implemented as an LSI, which is an integrated circuit. Such processing units may be individually made into a single chip or may be partially or entirely made into a single chip.

Furthermore, ways to achieve circuit integration are not limited to the LSI, and a dedicated circuit or a general purpose processor can also achieve the integration. It may also be possible to utilize an FPGA (Field Programmable Gate Array) that can be programmed after the LSI production or a reconfigurable processor that can reconfigure the connection and settings of a circuit cell inside the LSI.

It should be noted that, in each embodiment described above, each structural component may be constituted by dedicated hardware or be realized by executing a software program suitable for each structural component. Each structural component may be realized by a program execution unit such as a CPU or a processor reading out and executing a software program stored in a hard disk or a recording medium such as a semiconductor memory.

In other words, the image decoding apparatus and the image encoding apparatus includes a processing circuitry, and a storage that is electrically connected to the processing circuitry (accessible from the processing circuitry). The processing circuitry includes at least one of dedicated hardware and a program executing unit. Also, when the processing circuitry includes the program executing unit, the storage stores a software program executed by this program executing unit. The processing circuitry uses the storage so as to execute the image decoding method or the image encoding method according to the embodiment described above.

Furthermore, the present disclosure may be the software program mentioned above or a non-transitory computer-readable recording medium on which such a program is recorded. Also, it is needless to say that the above-noted program can be distributed via a transmission medium such as the Internet.

Moreover, all of the numerals used above are examples for specifically describing the present disclosure, and the present disclosure is by no means limited to these numerals.

Further, how the functional blocks are divided in the block diagram is merely exemplary. It may also be possible to realize a plurality of functional blocks as one functional block, divide one functional block into plural functional blocks, or transfer part of the function to another functional block. In addition, single hardware or software may process the functions of plural functional blocks having similar functions in parallel or by time division.

Also, the order of executing the steps included in the image decoding method or the image encoding method described above is an example for specifically describing the present disclosure, and may be an order other than the above. Additionally, part of the above-described steps may be executed simultaneously (in parallel) with another step.

Although the above description has been directed to an illustrative embodiment, the scope of claims of the present application is by no means limited to this embodiment. Anyone having an ordinary skill in the art would easily appreciate that, without departing from the novel teaching and advantage of the subject matter recited in the claims attached hereto, various modifications may be made to the above embodiment and the structural components in the above embodiment may be combined optionally to achieve another embodiment. Therefore, such a variation and another embodiment are also included in the present disclosure.

Embodiment 2

The processing described in each of embodiments can be simply implemented in an independent computer system, by recording, in a recording medium, one or more programs for implementing the configurations of the moving picture encoding method (image encoding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture encoding method (image encoding method) and the moving picture decoding method (image decoding method) described in each of embodiments and systems using thereof will be described. The system has a feature of having an image coding apparatus that includes an image encoding apparatus using the image encoding method and an image decoding apparatus using the image decoding method. Other configurations in the system can be changed as appropriate depending on the cases.

Figure 17:
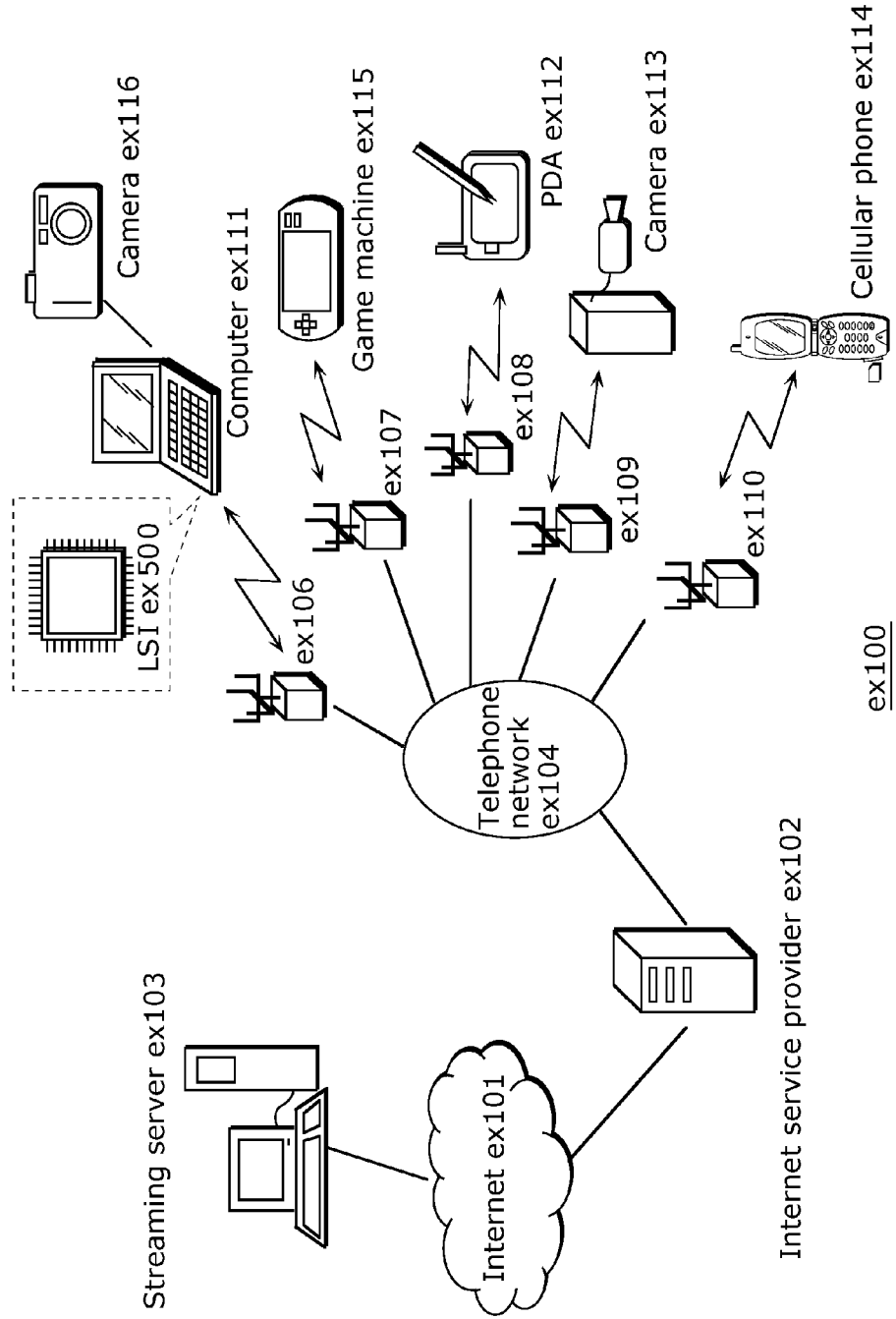
FIG. 17 shows an overall configuration of a content providing system for implementing content distribution services.

FIG. 17 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 17, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video.

Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is encoded as described above in each of embodiments (i.e., the camera functions as the image encoding apparatus according to an aspect of the present disclosure), and the encoded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned encoded data. Each of the devices that have received the distributed data decodes and reproduces the encoded data (i.e., functions as the image decoding apparatus according to an aspect of the present disclosure).

The captured data may be encoded by the camera ex113 or the streaming server ex103 that transmits the data, or the encoding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and/or video captured by not only the camera ex113 but also the camera ex116 may be transmitted to the streaming server ex103 through the computer ex111. The encoding processes may be performed by the camera ex116, the computer ex111, or the streaming server ex103, or shared among them.

Furthermore, the coding processes may be performed by an LSI ex500 generally included in each of the computer ex111 and the devices. The LSI ex500 may be configured of a single chip or a plurality of chips. Software for coding video may be integrated into some type of a recording medium (such as a CD-ROM, a flexible disk, and a hard disk) that is readable by the computer ex111 and others, and the coding processes may be performed using the software. Furthermore, when the cellular phone ex114 is equipped with a camera, the video data obtained by the camera may be transmitted. The video data is data encoded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the encoded data in the content providing system ex100. In other words, the clients can receive and decode information transmitted by the user, and reproduce the decoded data in real time in the content providing system ex100, so that the user who does not have any particular right and equipment can implement personal broadcasting.

Figure 18:
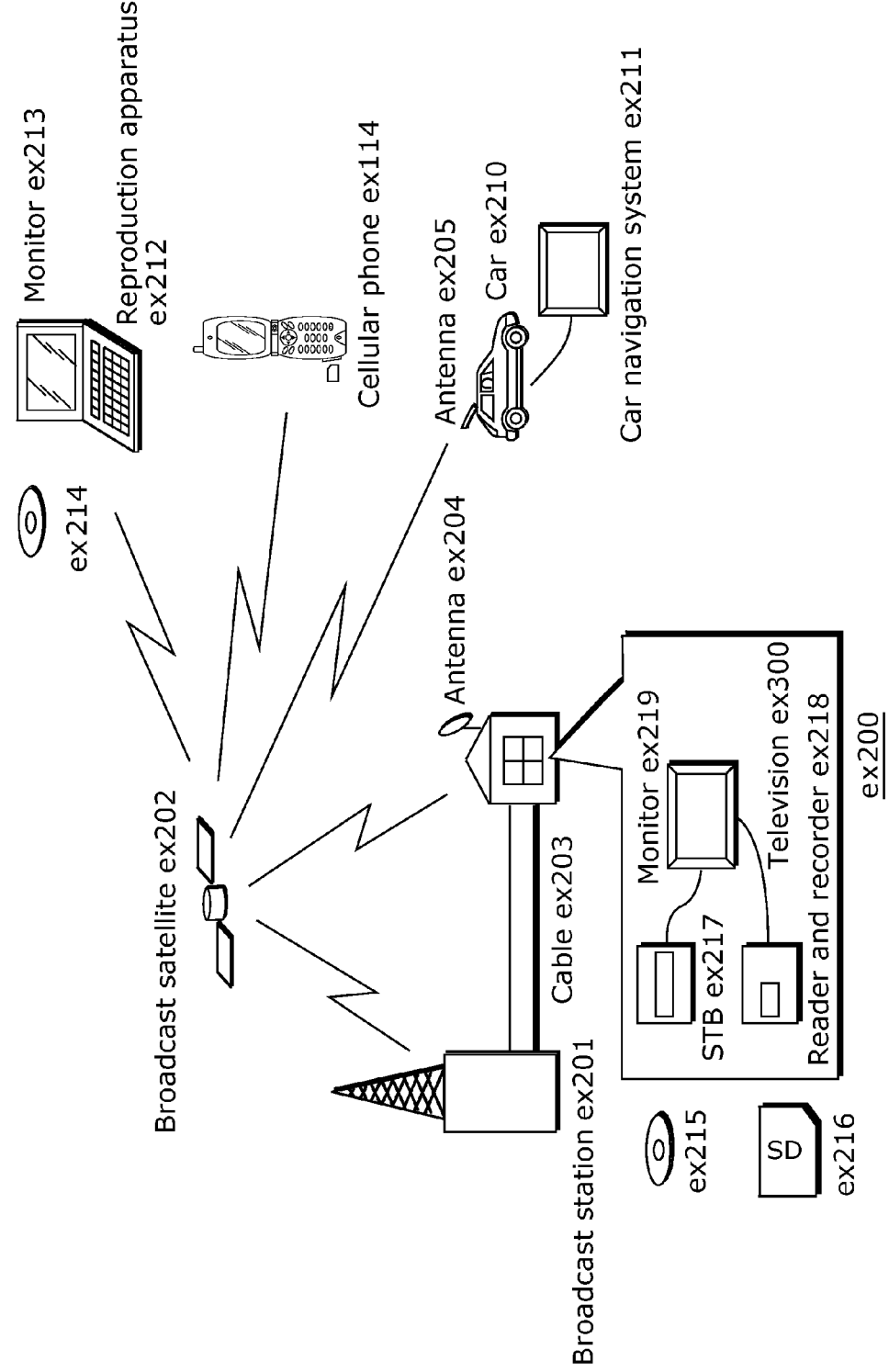
FIG. 18 shows an overall configuration of a digital broadcasting system.

Aside from the example of the content providing system ex100, at least one of the moving picture coding apparatus (image coding apparatus) described in each of embodiments may be implemented in a digital broadcasting system ex200 illustrated in FIG. 18. More specifically, a broadcast station ex201 communicates or transmits, via radio waves to a broadcast satellite ex202, multiplexed data obtained by multiplexing audio data and others onto video data. The video data is data encoded by the moving picture encoding method described in each of embodiments (i.e., data encoded by the image encoding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) encodes video signals in the recording medium ex215, and in some cases, writes data obtained by multiplexing an audio signal on the encoded data. The reader/recorder ex218 can include the moving picture decoding apparatus or the moving picture encoding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 19:
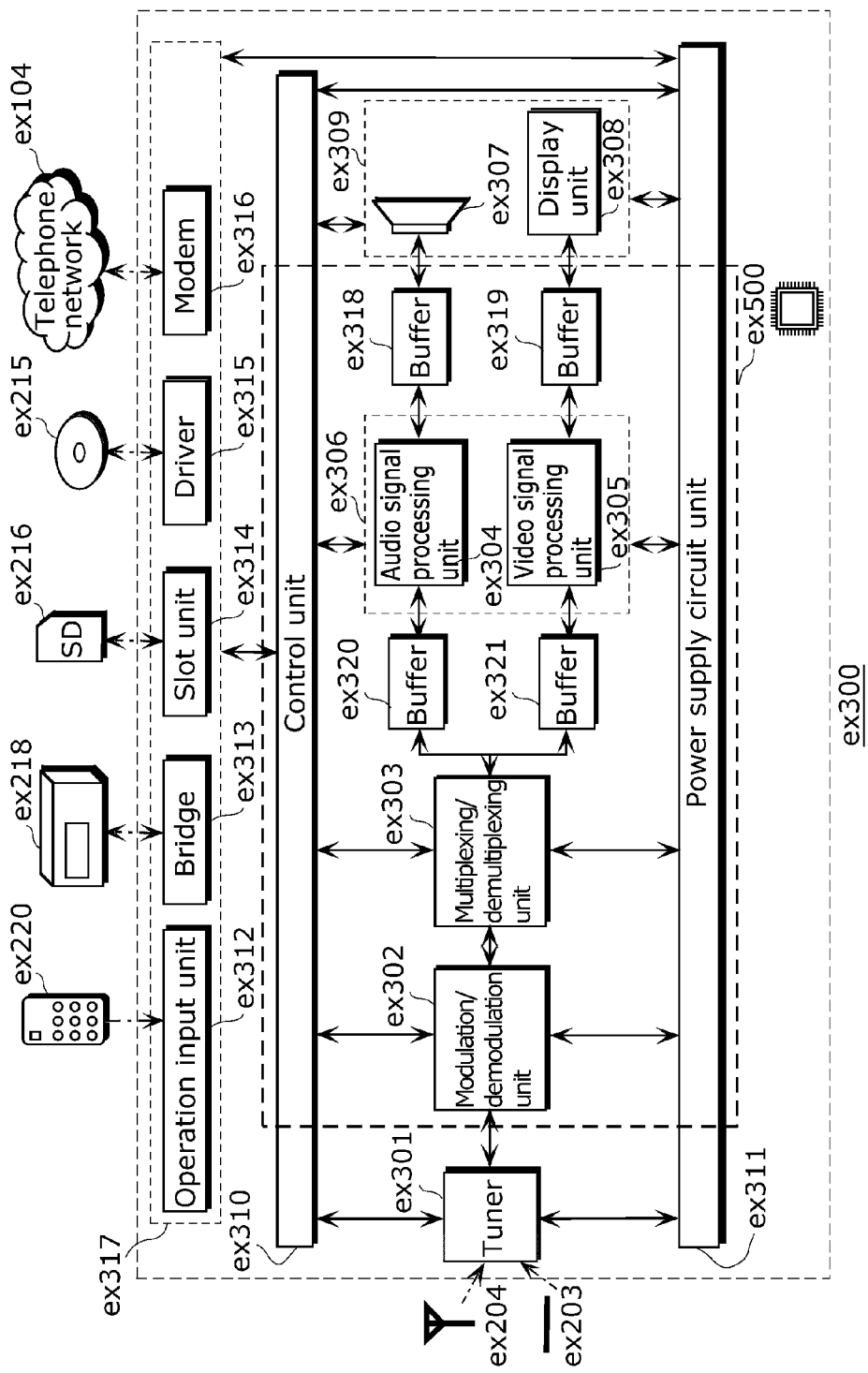
FIG. 19 shows a block diagram illustrating an example of a configuration of a television.

FIG. 19 illustrates the television (receiver) ex300 that uses the moving picture encoding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data encoded by a signal processing unit ex306 into data.

The television ex300 further includes: a signal processing unit ex306 including an audio signal processing unit ex304 and a video signal processing unit ex305 that code each of audio data and video data, (which function as the image coding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 encodes an audio signal and a video signal, and transmits the data outside or writes the data on a recording medium will be described. In the television ex300, upon a user operation through the remote controller ex220 and others, the audio signal processing unit ex304 encodes an audio signal, and the video signal processing unit ex305 encodes a video signal, under control of the control unit ex310 using the encoding method described in each of embodiments. The multiplexing/demultiplexing unit ex303 multiplexes the encoded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may encode the obtained data. Although the television ex300 can encode, multiplex, and provide outside data in the description, it may be capable of only receiving, decoding, and providing outside data but not the encoding, multiplexing, and providing outside data.

Furthermore, when the reader/recorder ex218 reads or writes multiplexed data from or on a recording medium, one of the television ex300 and the reader/recorder ex218 may code the multiplexed data, and the television ex300 and the reader/recorder ex218 may share the coding partly.

Figure 20:
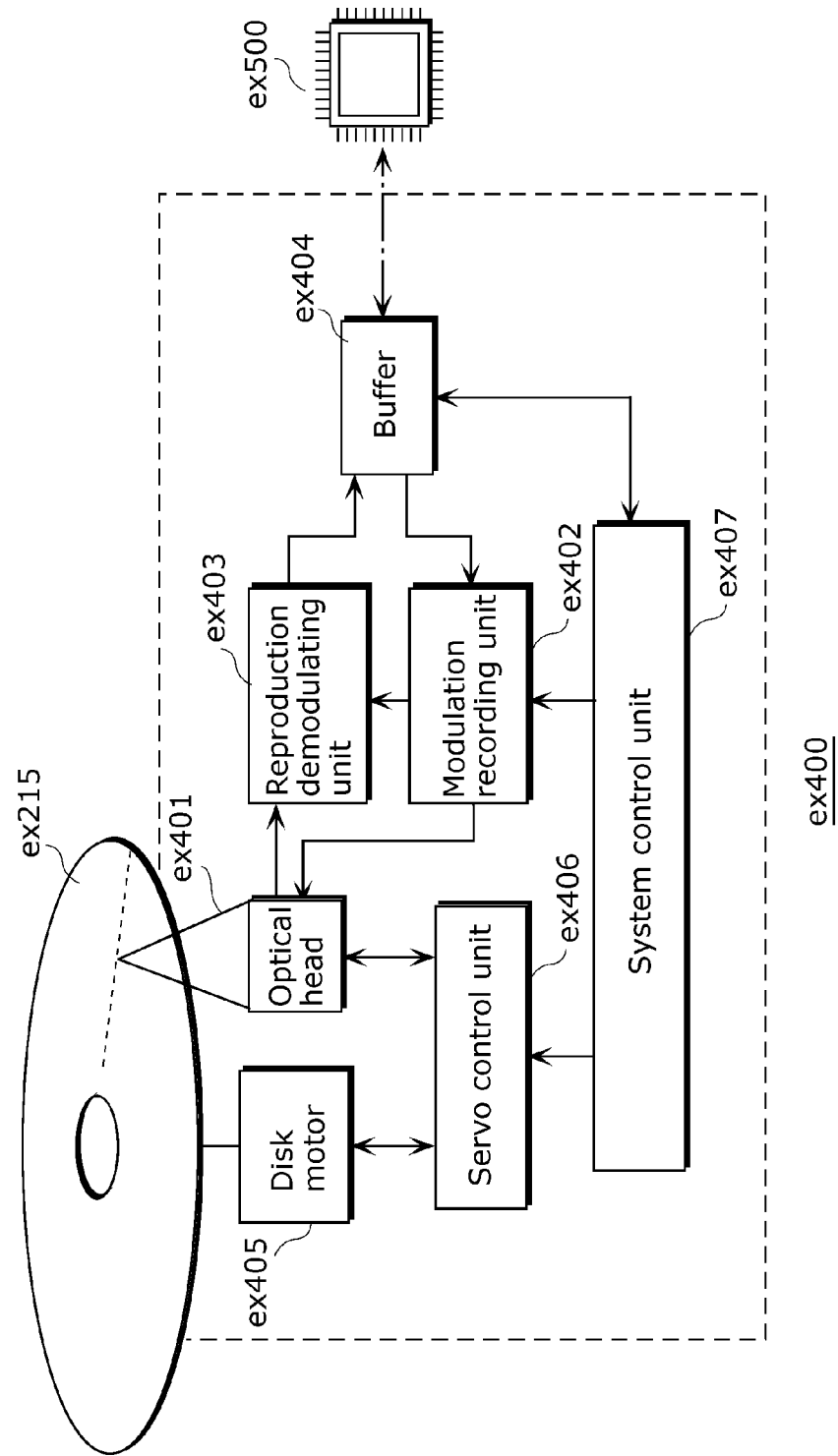
FIG. 20 shows a block diagram illustrating an example of a configuration of an information reproducing/recording unit that reads and writes information from and on a recording medium that is an optical disk.

As an example, FIG. 20 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 21:
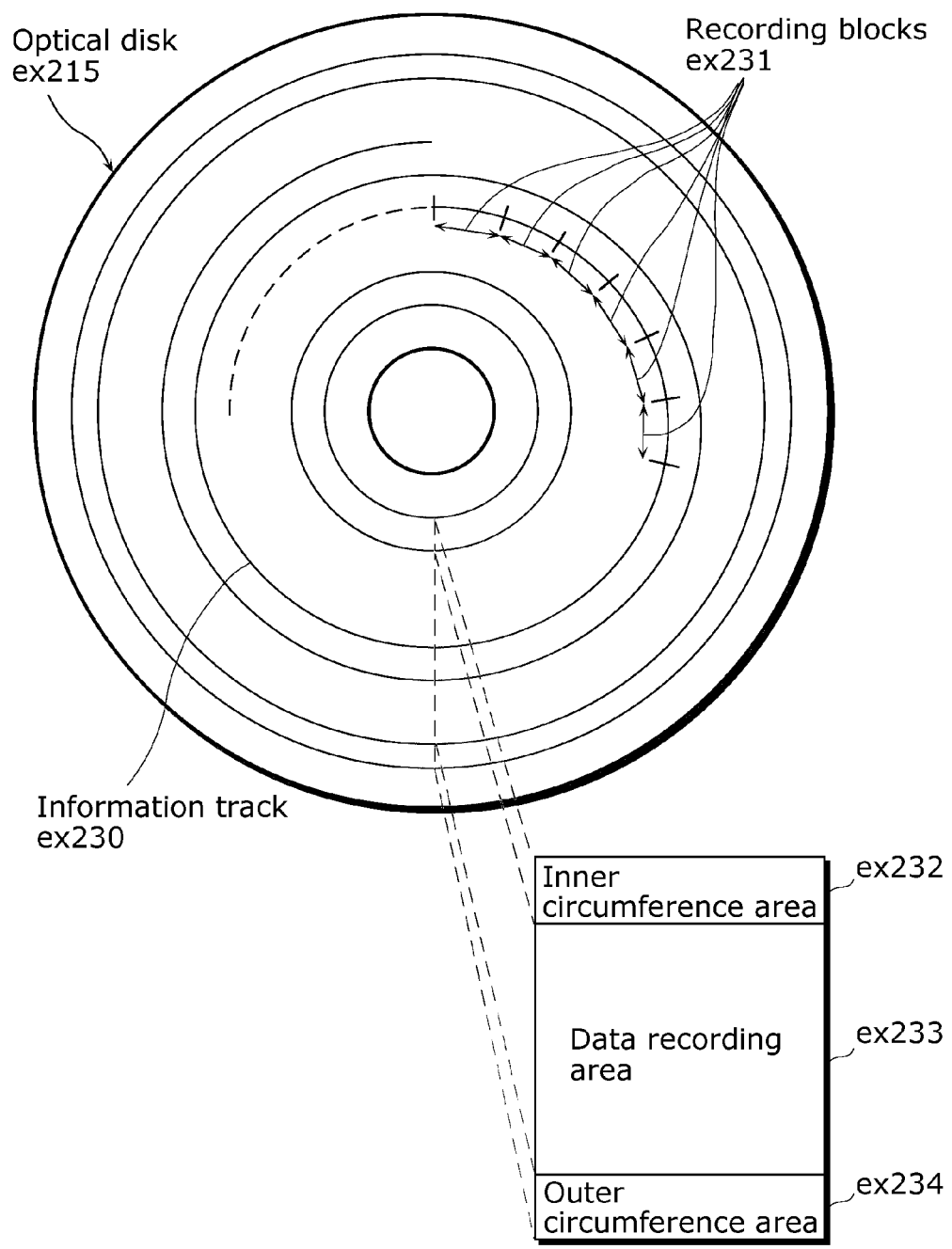
FIG. 21 shows an example of a configuration of a recording medium that is an optical disk.

FIG. 21 schematically illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes encoded audio, encoded video data, or multiplexed data obtained by multiplexing the encoded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 19. The same will be true for the configuration of the computer e111, the cellular phone ex114, and others.

Figure 22A:
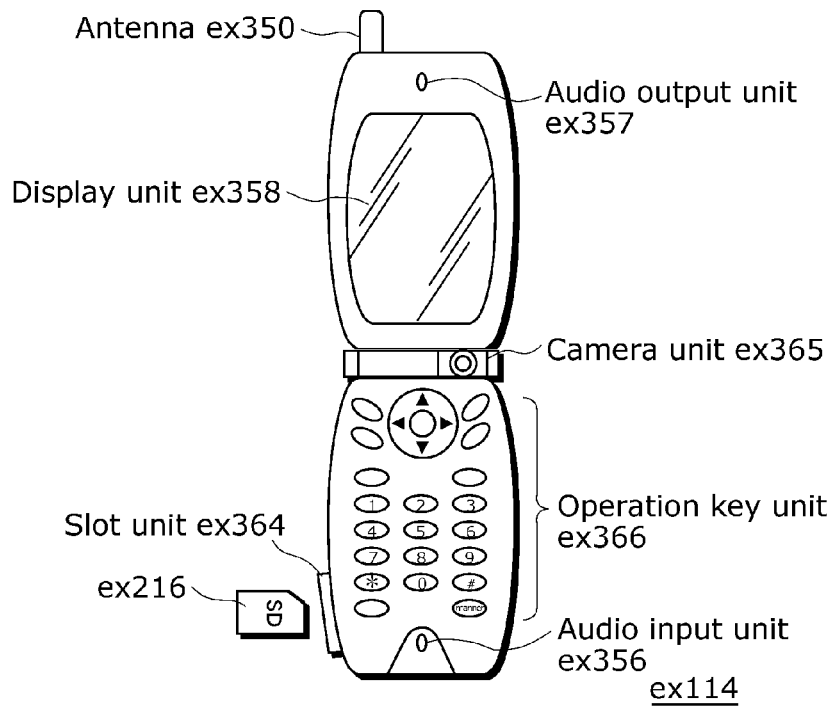
FIG. 22A shows an example of a cellular phone.

FIG. 22A illustrates the cellular phone ex114 that uses the moving picture coding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded data of the received video, the still pictures, e-mails, or others; and a slot unit ex364 that is an interface unit for a recording medium that stores data in the same manner as the memory unit ex367.

Figure 22B:
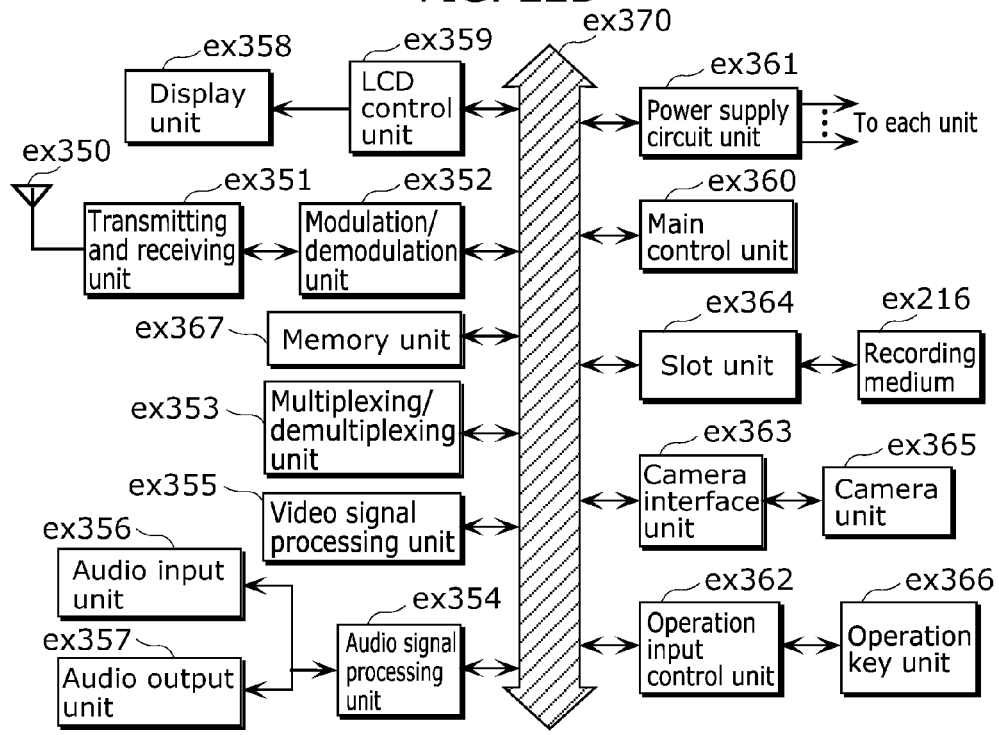
FIG. 22B is a block diagram showing an example of a configuration of a cellular phone.

Next, an example of a configuration of the cellular phone ex114 will be described with reference to FIG. 22B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and encodes video signals supplied from the camera unit ex365 using the moving picture encoding method shown in each of embodiments (i.e., functions as the image encoding apparatus according to the aspect of the present disclosure), and transmits the encoded video data to the multiplexing/demultiplexing unit ex353. In contrast, during when the camera unit ex365 captures video, still images, and others, the audio signal processing unit ex354 encodes audio signals collected by the audio input unit ex356, and transmits the encoded audio data to the multiplexing/demultiplexing unit ex353.

The multiplexing/demultiplexing unit ex353 multiplexes the encoded video data supplied from the video signal processing unit ex355 and the encoded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the encoded video data and the audio signal processing unit ex354 with the encoded audio data, through the synchronous bus ex370. The video signal processing unit ex355 decodes the video signal using a moving picture decoding method corresponding to the moving picture encoding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both an encoding apparatus and a decoding apparatus, but also (ii) a transmitting terminal including only an encoding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method in each of embodiments can be used in any of the devices and systems described. Thus, the advantages described in each of embodiments can be obtained.

Furthermore, various modifications and revisions can be made in any of the embodiments in the present disclosure.

Embodiment 3

Video data can be generated by switching, as necessary, between (i) the moving picture encoding method or the moving picture encoding apparatus shown in each of embodiments and (ii) a moving picture encoding method or a moving picture encoding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, an appropriate decoding method cannot be selected.

In view of this, multiplexed data obtained by multiplexing audio data and others onto video data has a structure including identification information indicating to which standard the video data conforms. The specific structure of the multiplexed data including the video data generated in the moving picture encoding method and by the moving picture encoding apparatus shown in each of embodiments will be hereinafter described. The multiplexed data is a digital stream in the MPEG-2 Transport Stream format.

FIG. 23 illustrates a structure of the multiplexed data. As illustrated in FIG. 23, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part of the movie and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is encoded in the moving picture encoding method or by the moving picture encoding apparatus shown in each of embodiments, or in a moving picture encoding method or by a moving picture encoding apparatus in conformity with a conventional standard, such as MPEG-2, MPEG-4 AVC, and VC-1. The audio stream is encoded in accordance with a standard, such as Dolby-AC-3, Dolby Digital Plus, MLP, DTS, DTS-HD, or linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 24:
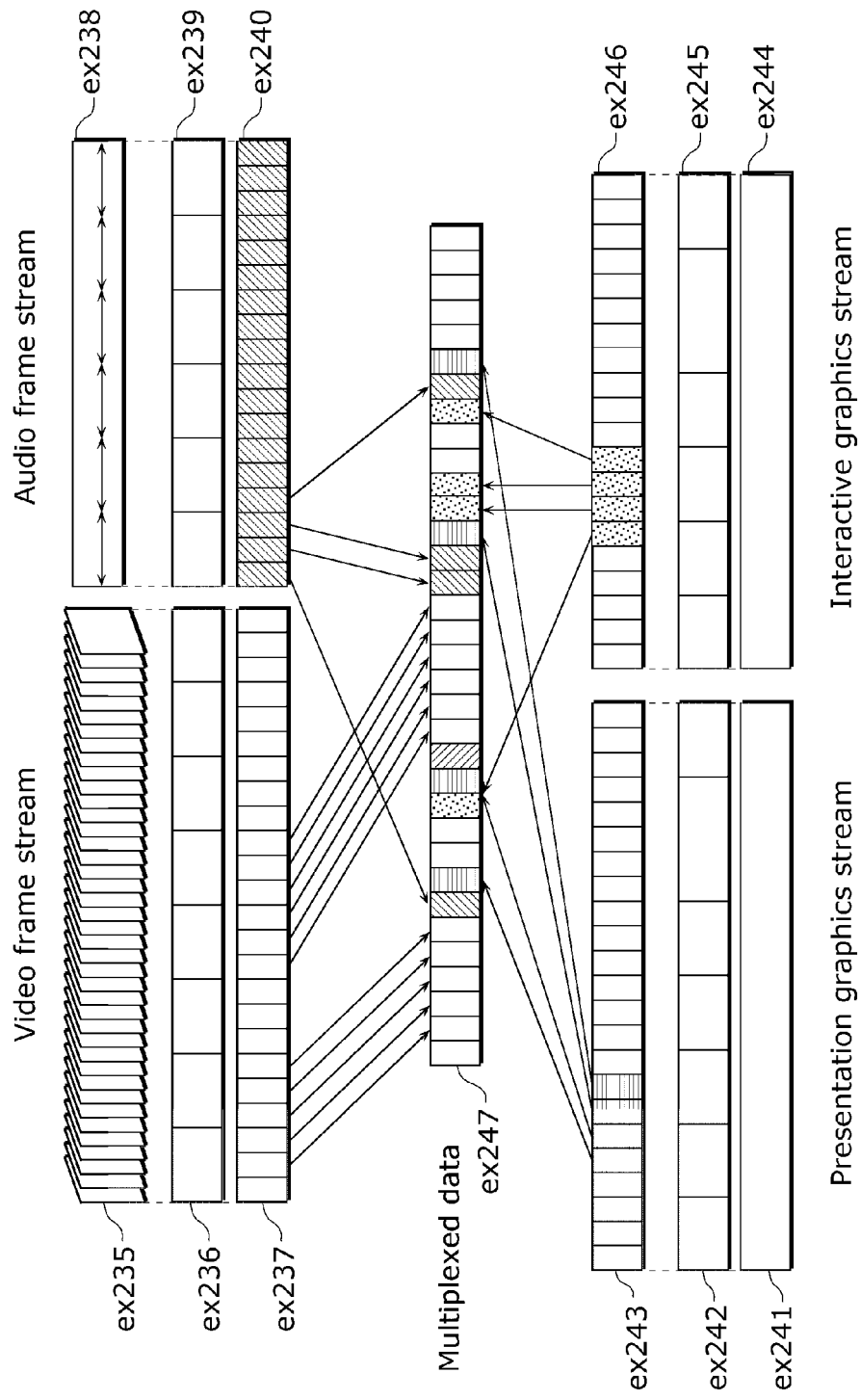
FIG. 24 schematically shows how each stream is multiplexed in multiplexed data.

FIG. 24 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 25:
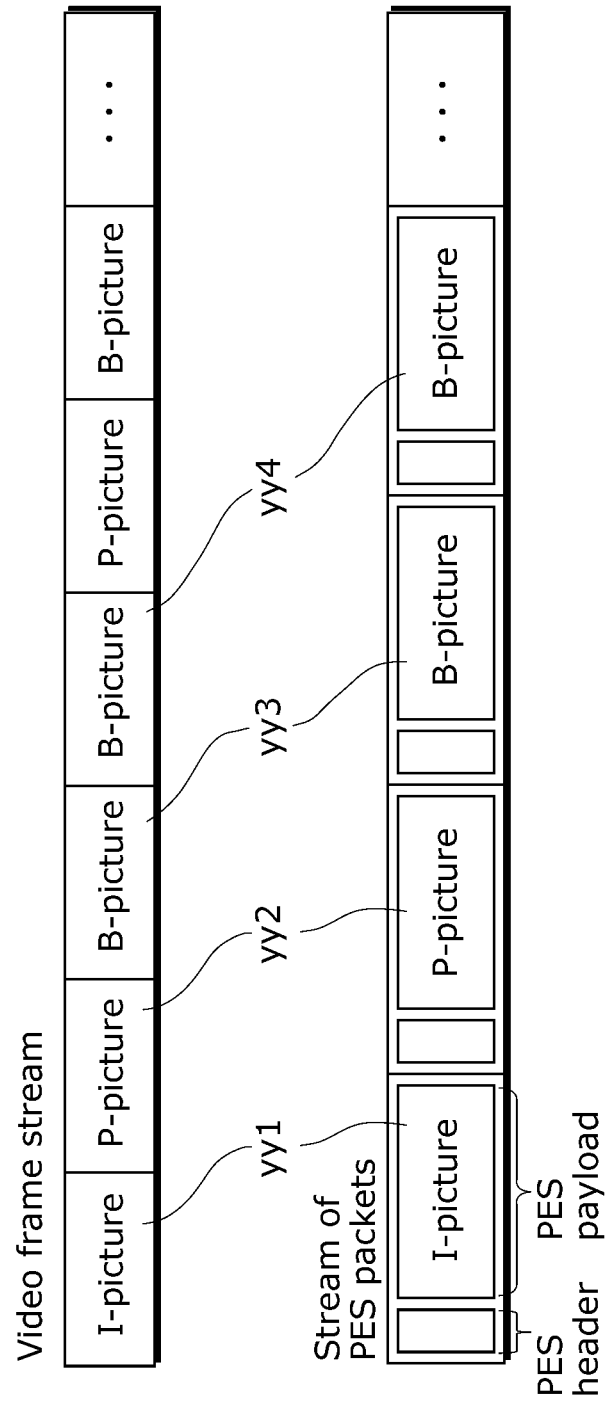
FIG. 25 shows how a video stream is stored in a stream of PES packets in more detail.

FIG. 25 illustrates how a video stream is stored in a stream of PES packets in more detail. The first bar in FIG. 25 shows a video frame stream in a video stream. The second bar shows the stream of PES packets. As indicated by arrows denoted as yy1, yy2, yy3, and yy4 in FIG. 25, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 26 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter of a decoder. The source packets are arranged in the multiplexed data as shown at the bottom of FIG. 26. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 27:
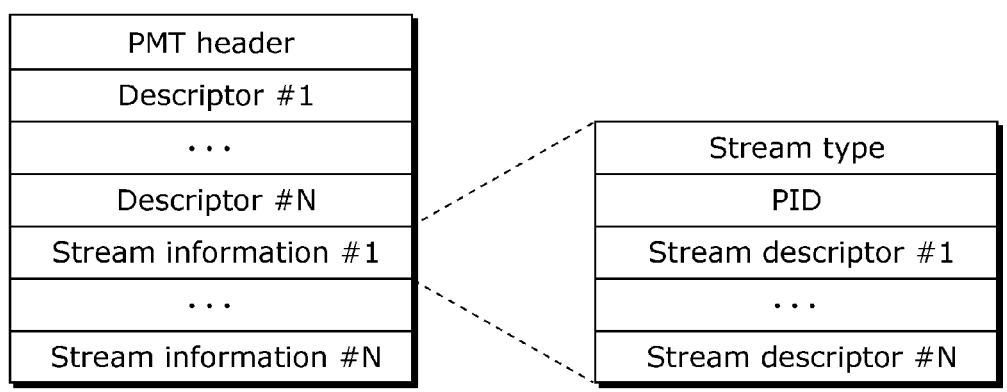
FIG. 27 shows a data structure of a PMT.

FIG. 27 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 28:
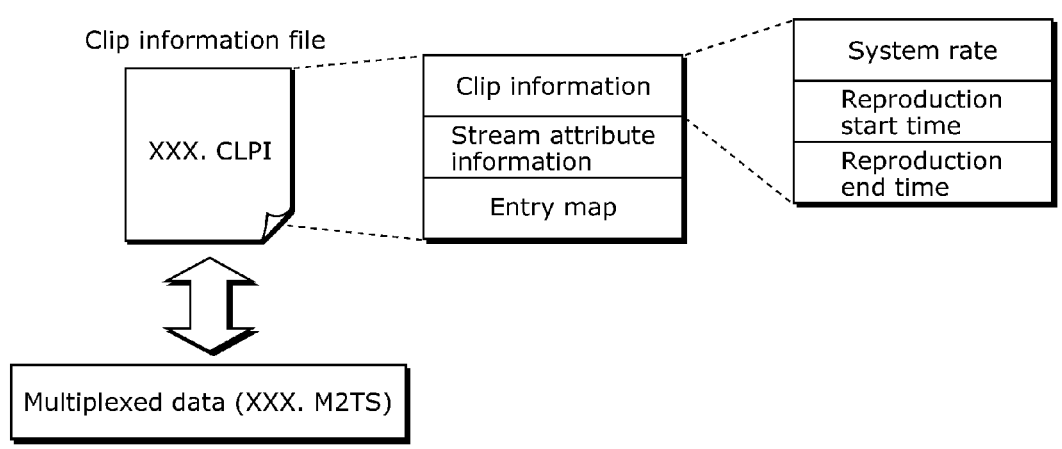
FIG. 28 shows an internal structure of multiplexed data information.

Each of the multiplexed data information files is management information of the multiplexed data as shown in FIG. 28. The multiplexed data information files are in one to one correspondence with the multiplexed data, and each of the files includes multiplexed data information, stream attribute information, and an entry map.

As illustrated in FIG. 28, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 29:
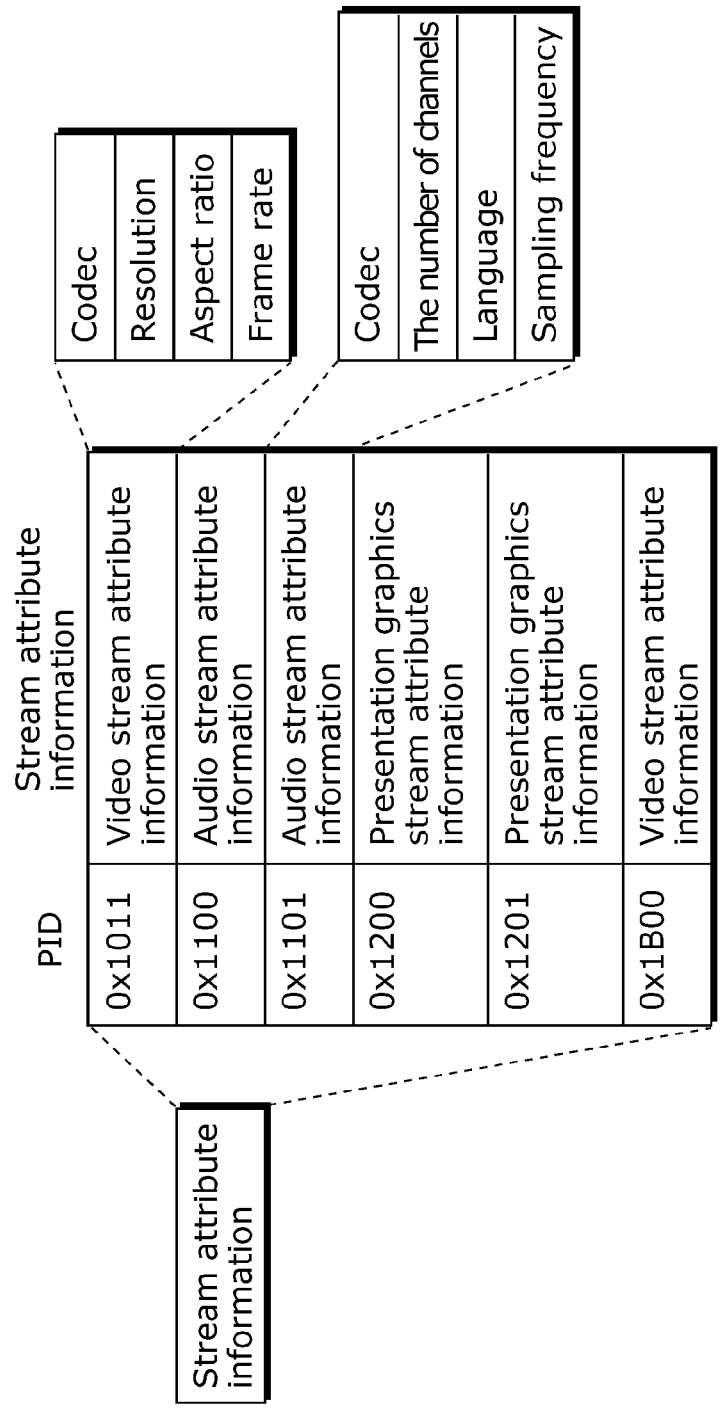
FIG. 29 shows an internal structure of stream attribute information.

As shown in FIG. 29, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture encoding method or the moving picture encoding apparatus described in each of embodiments includes a step or a unit for allocating unique information indicating video data generated by the moving picture encoding method or the moving picture encoding apparatus in each of embodiments, to the stream type included in the PMT or the video stream attribute information. With the configuration, the video data generated by the moving picture encoding method or the moving picture encoding apparatus described in each of embodiments can be distinguished from video data that conforms to another standard.

Figure 30:
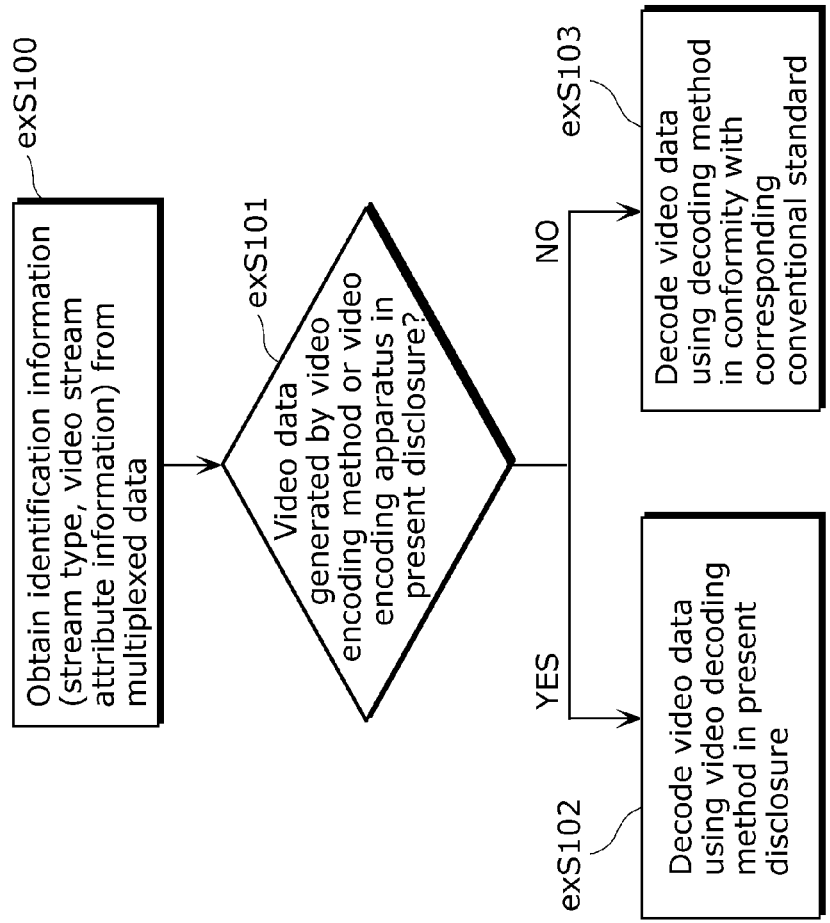
FIG. 30 shows steps for identifying video data.

Furthermore, FIG. 30 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture encoding method or the moving picture encoding apparatus in each of embodiments. When it is determined that the stream type or the video stream attribute information indicates that the multiplexed data is generated by the moving picture encoding method or the moving picture encoding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination of whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture encoding method or apparatus, or the moving picture decoding method or apparatus in the present embodiment can be used in the devices and systems described above.

Embodiment 4

Figure 31:
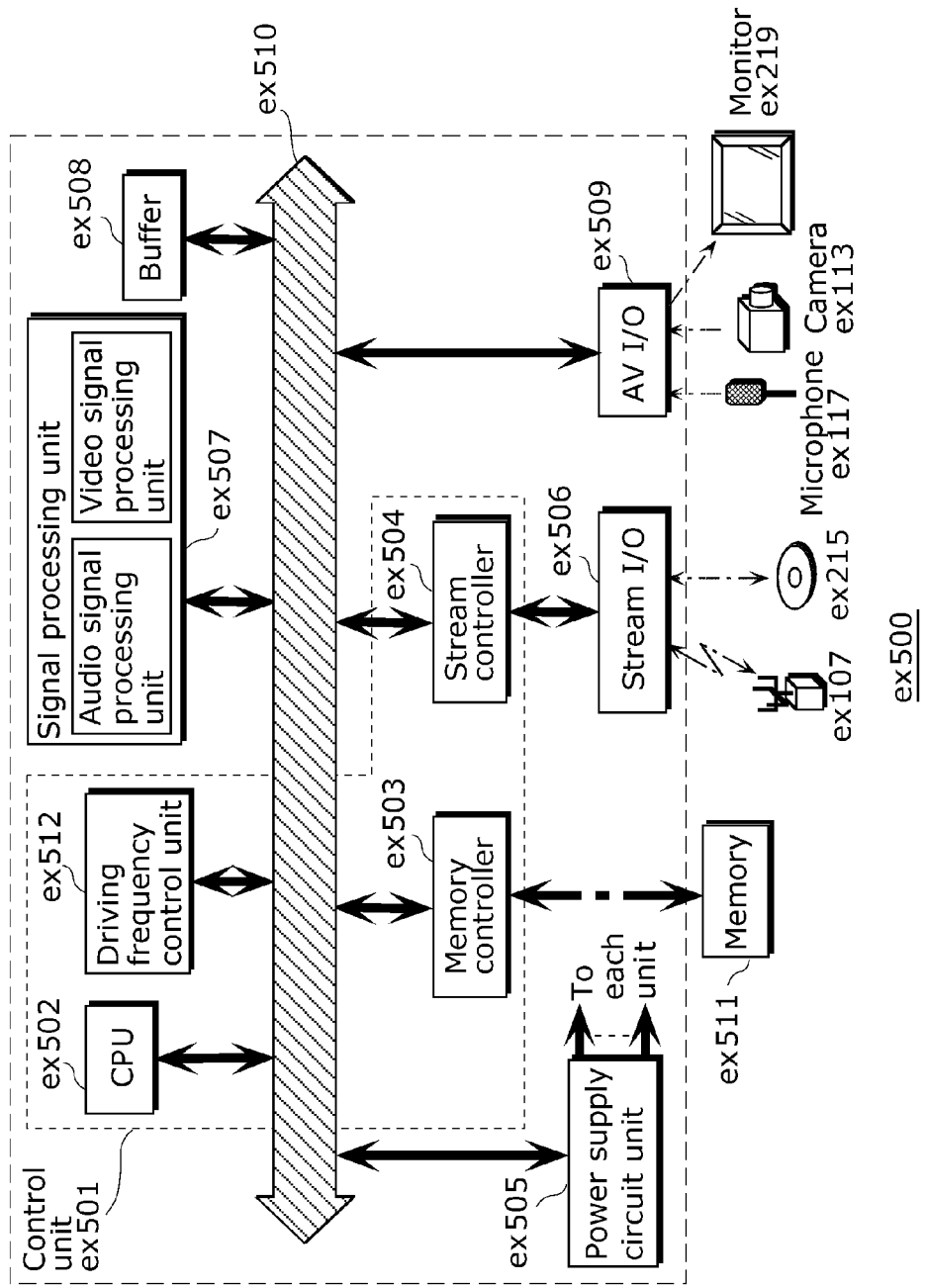
FIG. 31 shows an example of a configuration of an integrated circuit for implementing the moving picture coding method according to each of embodiments.

Each of the moving picture coding method and the moving picture coding apparatus in each of embodiments is typically achieved in the form of an integrated circuit or a Large Scale Integrated (LSI) circuit. As an example of the LSI, FIG. 31 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when encoding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 encodes an audio signal and/or a video signal. Here, the encoding of the video signal is the encoding described in each of embodiments. Furthermore, the signal processing unit ex507 sometimes multiplexes the encoded audio data and the encoded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of circuit cells in an LSI can be used for the same purpose. Such a programmable logic device can typically execute the moving picture coding method according to any of the above embodiments, by loading or reading from a memory or the like one or more programs that are included in software or firmware.

In the future, with advancement in semiconductor technology, a brand-new technology may replace LSI. The functional blocks can be integrated using such a technology. The possibility is that the present disclosure is applied to biotechnology.

Embodiment 5

When video data generated in the moving picture encoding method or by the moving picture encoding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, the power consumption increases.

Figure 32:
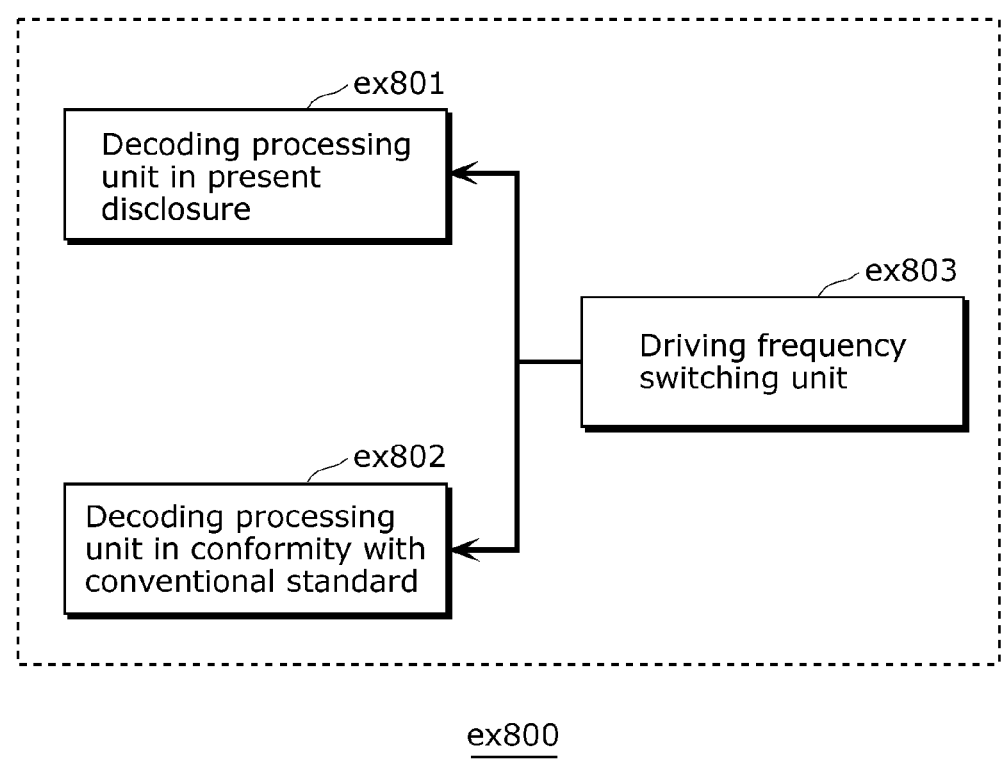
FIG. 32 shows a configuration for switching between driving frequencies.

In view of this, the moving picture decoding apparatus, such as the television ex300 and the LSI ex500 is configured to determine to which standard the video data conforms, and switch between the driving frequencies according to the determined standard. FIG. 32 illustrates a configuration ex800 in the present embodiment. A driving frequency switching unit ex803 sets a driving frequency to a higher driving frequency when video data is generated by the moving picture encoding method or the moving picture encoding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture encoding method or the moving picture encoding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 31. Here, each of the decoding processing unit ex801 that executes the moving picture decoding method described in each of embodiments and the decoding processing unit ex802 that conforms to the conventional standard corresponds to the signal processing unit ex507 in FIG. 31. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 3 is probably used for identifying the video data. The identification information is not limited to the one described in Embodiment 3 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 34. The driving frequency can be selected by storing the look-up table in the buffer ex508 and in an internal memory of an LSI, and with reference to the look-up table by the CPU ex502.

Figure 33:
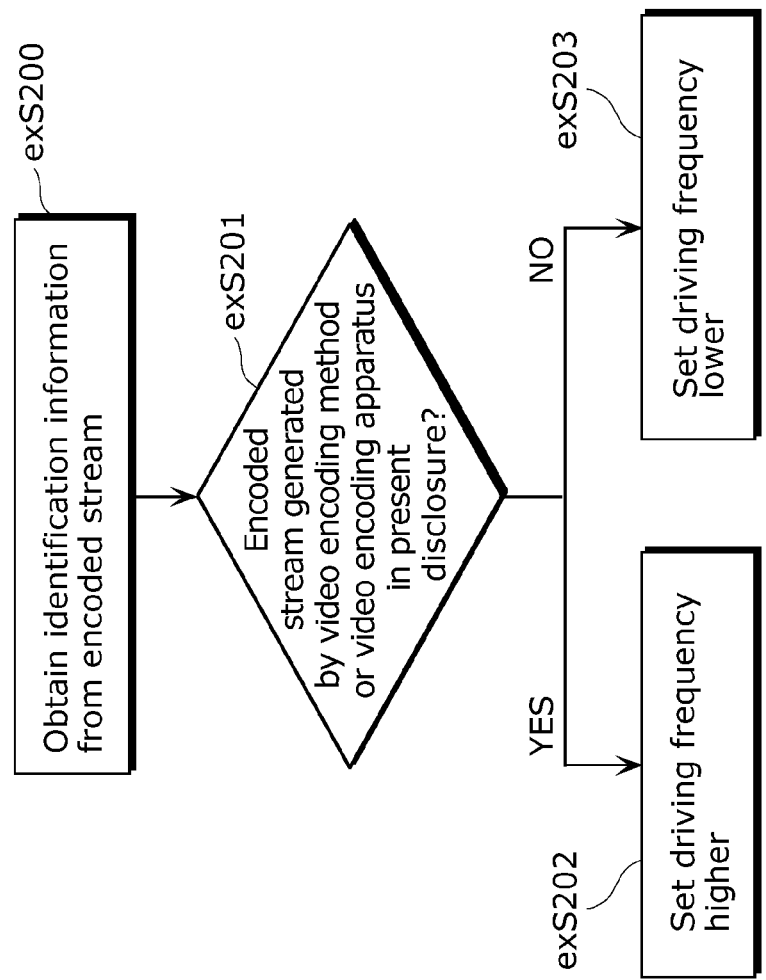
FIG. 33 shows steps for identifying video data and switching between driving frequencies.

FIG. 33 illustrates steps for executing a method in the present embodiment. First, in Step exS200, the signal processing unit ex507 obtains identification information from the multiplexed data. Next, in Step exS201, the CPU ex502 determines whether or not the video data is generated by the encoding method and the encoding apparatus described in each of embodiments, based on the identification information. When the video data is generated by the moving picture encoding method and the moving picture encoding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture encoding method and the moving picture encoding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture encoding method and the moving picture encoding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture encoding method and the moving picture encoding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture encoding method and the moving picture encoding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture encoding method and the moving picture encoding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 6

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, increase in the scale of the circuit of the LSI ex500 and increase in the cost arise with the individual use of the signal processing units ex507 that conform to the respective standards.

Figure 35A:
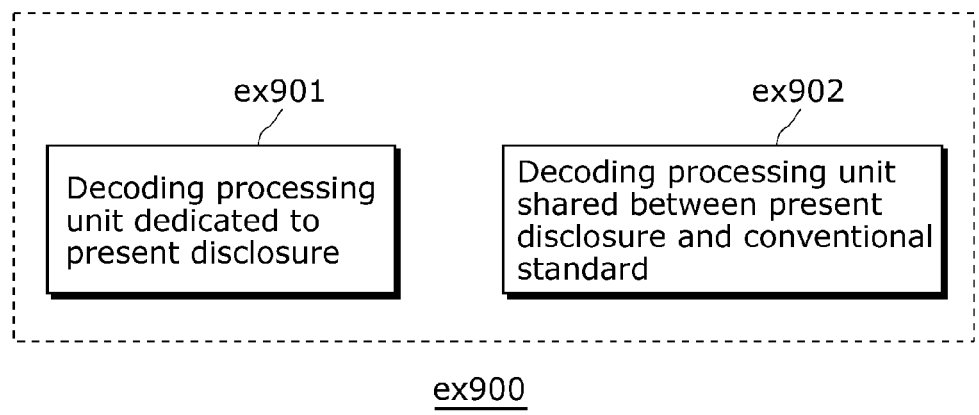
FIG. 35A is a diagram showing an example of a configuration for sharing a module of a signal processing unit.

In view of this, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 35A shows an example of the configuration. For example, the moving picture decoding method described in each of embodiments and the moving picture decoding method that conforms to MPEG-4 AVC have, partly in common, the details of processing, such as entropy encoding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing which is unique to an aspect of the present disclosure and does not conform to MPEG-4 AVC. Since the aspect of the present disclosure is characterized by deblocking filtering in particular, for example, the dedicated decoding processing unit ex901 is used for deblocking filtering. Otherwise, the decoding processing unit is probably shared for one of the inverse quantization, entropy decoding, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 35B:
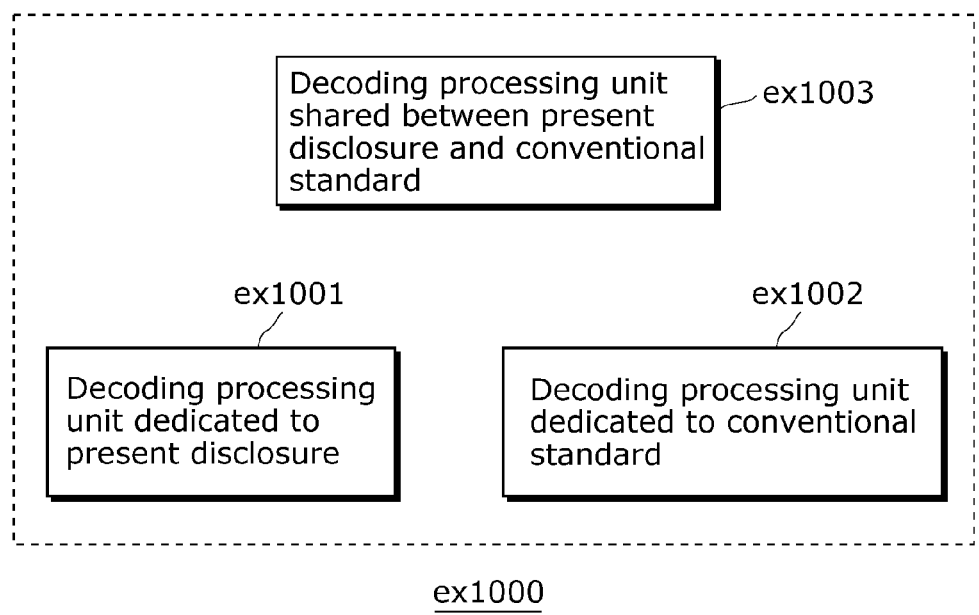
FIG. 35B is a diagram showing another example of a configuration for sharing a module of the signal processing unit.

Furthermore, ex1000 in FIG. 35B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

The present disclosure is applicable to an image decoding method and an image decoding apparatus or an image processing method and an image processing apparatus. Also, the present disclosure can be utilized for a high-definition information displaying instrument or an imaging instrument including an image decoding apparatus, such as a television, a digital video recorder, a car navigation system, a cellular phone, a digital camera and a digital video camera.

The invention claimed is:

1. An image encoding method performed by an image encoding apparatus for encoding an image, the image encoding apparatus including a hardware processor configured to execute the image encoding method comprising:

selecting, using the hardware processor, one motion prediction model from a plurality of motion prediction models for each block of blocks in the image, the plurality of motion prediction models including a translational motion model and a non-translational motion model different from the translational motion model;

performing, using the hardware processor, motion prediction using the selected motion prediction model to generate a prediction image for each of the blocks;

generating, using the hardware processor, a reconstructed image for each of the blocks using the prediction image;

determining, using the hardware processor, that filtering is to be performed if the non-translational motion model is selected for at least one of a first block and a second block and determining that filtering is not to be performed if the translational motion model is selected for both the first block and the second block, the first block being one of the blocks, blocks and the second block being another one of the blocks and adjacent to the first block; and performing, using the hardware processor, the filtering on a boundary between the reconstructed image for the first block and the reconstructed image for the second block if it is determined that the filtering is to be performed, the filtering being for reducing an image distortion at the boundary.

2. The image encoding method according to claim 1,
wherein, in the determining that the filtering is to be performed:

it is determined whether or not both of the following conditions (i) and (ii) are satisfied: (i) a first reference region that is referred to for generating the prediction image for the first block and a second reference region that is referred to for generating the prediction image for the second block are included in a same reference image, and (ii) the first reference region and the second reference region are adjacent to each other with their boundaries coinciding with each other;

it is determined that the filtering is to be performed if the non-translational motion model is selected for at least one of the first block and the second block and if any of the conditions (i) and (ii) is dissatisfied; and it is determined that the filtering is not to be performed if both of the conditions (i) and (ii) are satisfied.

3. The image encoding method according to claim 2,
wherein, in the determining that the filtering is to be performed, it is determined that the first reference region and the second reference region are adjacent to each other with their boundaries coinciding with each other, using different computation techniques for when the first block and the second block are vertically adjacent to each other and for when the first block and the second block are horizontally adjacent to each other.

4. The image encoding method according to claim 2,
wherein, in the determining that the filtering is to be performed, it is determined that the first reference region and the second reference region are not adjacent to each other with their boundaries coinciding with each other if the motion prediction model selected for the first block and the motion prediction model selected for the second block are different.

5. The image encoding method according to claim 2,
wherein, in the determining that the filtering is to be performed, it is determined whether or not a distance between a side of the first reference region and a side of the second reference region is less than one pixel, and it is determined that the first reference region and the second reference region are adjacent to each other with their boundaries coinciding with each other if the distance is less than one pixel.

6. The image encoding method according to claim 1,
wherein the non-translational motion model is the motion prediction model including at least one of rotation, enlargement, reduction, skewing, and inversion.

7. An image decoding method performed by an image decoding apparatus for decoding an encoded image obtained by encoding an image, the image decoding apparatus including a hardware processor configured to execute the image decoding method comprising:

selecting, using the hardware processor, one motion prediction model from a plurality of motion prediction models for each block of blocks in the image, the plurality of motion prediction models including a translational motion model and a non-translational motion model different from the translational motion model;

performing, using the hardware processor, motion prediction using the selected motion prediction model to generate a prediction image for each of the blocks;

generating, using the hardware processor, a reconstructed image for each of the blocks using the prediction image;

determining, using the hardware processor, that filtering is to be performed if the non-translational motion model is selected for at least one of a first block and a second block and determining that filtering is not to be performed if the translational motion model is selected for both the first block and the second block, the first block being one of the blocks and the second block being another one of the blocks and adjacent to the first block; and performing, using the hardware processor, the filtering on a boundary between the reconstructed image for the first block and the reconstructed image for the second block if it is determined that the filtering is to be performed, the filtering being for reducing an image distortion at the boundary.

8. The image decoding method according to claim 7,
wherein, in the determining that the filtering is to be performed:

it is determined whether or not both of the following conditions (i) and (ii) are satisfied: (i) a first reference region that is referred to for generating the prediction image for the first block and a second reference region that is referred to for generating the prediction image for the second block are included in a same reference image, and (ii) the first reference region and the second reference region are adjacent to each other with their boundaries coinciding with each other;

it is determined that the filtering is to be performed if the non-translational motion model is selected for at least one of the first block and the second block and if any of the conditions (i) and (ii) is dissatisfied; and it is determined that the filtering is not to be performed if both of the conditions (i) and (ii) are satisfied.

9. The image decoding method according to claim 8,
wherein, in the determining that the filtering is to be performed, it is determined that the first reference region and the second reference region are adjacent to each other with their boundaries coinciding with each other, using different computation techniques for when the first block and the second block are vertically adjacent to each other and for when the first block and the second block are horizontally adjacent to each other.

10. The image decoding method according to claim 8, wherein, in the determining that the filtering is to be performed, it is determined that the first reference region and the second reference region are not adjacent to each other with their boundaries coinciding with each other if the motion prediction model selected for the first block and the motion prediction model selected for the second block are different.

11. The image decoding method according to claim 10, wherein, in the determining that the filtering is to be performed, it is determined whether or not a distance between a side of the first reference region and a side of the second reference region is less than one pixel, and it is determined that the first reference region and the second reference region are adjacent to each other with their boundaries coinciding with each other if the distance is less than one pixel.

12. The image decoding method according to claim 7, wherein the non-translational motion model is the motion prediction model including at least one of rotation, enlargement, reduction, skewing, and inversion.

13. The image encoding method according to claim 1, wherein the image encoding apparatus encodes an image, and the image encoding apparatus comprises:

processing circuitry; and storage that is accessible from the processing circuitry, wherein the processing circuitry uses the storage to execute the image encoding method.

14. The image decoding method according to claim 7, wherein the image decoding apparatus decodes an encoded image obtained by encoding an image, and the image decoding apparatus comprises:

processing circuitry; and storage that is accessible from the processing circuitry, wherein the processing circuitry uses the storage to execute the image decoding method.

* * * * *